United States Patent
Strong et al.

(10) Patent No.: US 9,499,074 B2
(45) Date of Patent: Nov. 22, 2016

(54) FORWARD AND REARWARD FACING CHILD SEAT WITH BELT TENSIONING MECHANISM FOR IMPROVED INSTALLATION

(71) Applicant: Britax Child Safety, Inc., Fort Mill, SC (US)

(72) Inventors: Lynn Curtis Strong, Rock Hill, SC (US); Mark Gunter, York, SC (US); Scott Alan Reed, York, SC (US)

(73) Assignee: BRITAX CHILD SAFETY, INC., Fort Mill, SC (US)

( * ) Notice: Subject to any disclaimer, the term of this patent is extended or adjusted under 35 U.S.C. 154(b) by 57 days.

(21) Appl. No.: 14/063,807

(22) Filed: Oct. 25, 2013

(65) Prior Publication Data

US 2015/0115676 A1     Apr. 30, 2015

(51) Int. Cl.
  *B60N 2/28*  (2006.01)
(52) U.S. Cl.
  CPC ............. *B60N 2/2806* (2013.01); *B60N 2/286* (2013.01); *B60N 2/2851* (2013.01); *B60N 2/2863* (2013.01); *Y10T 29/49826* (2015.01)
(58) Field of Classification Search
  None
  See application file for complete search history.

(56) References Cited

U.S. PATENT DOCUMENTS

| | | | |
|---|---|---|---|
| 5,186,063 A | 2/1993 | Nishizawa | |
| 5,228,746 A * | 7/1993 | Burleigh | B60N 2/2821 297/250.1 |
| 5,286,086 A | 2/1994 | Gunji | |
| 5,611,596 A * | 3/1997 | Barley | B60N 2/2806 297/256.13 |
| 5,671,971 A | 9/1997 | Koyanagi et al. | |

(Continued)

FOREIGN PATENT DOCUMENTS

| | | | |
|---|---|---|---|
| AU | 2 657 097 A | 11/1997 | |
| AU | 3 787 697 A | 3/1998 | |

(Continued)

OTHER PUBLICATIONS

Extended European Search Report for Application No. 13004238.5; dated Nov. 21, 2013.

(Continued)

*Primary Examiner* — David E Allred
(74) *Attorney, Agent, or Firm* — Nelson Mullins Riley & Scarborough LLP

(57) ABSTRACT

A child seat including a tensioning mechanism for applying tension to a seat belt to more fully secure the child seat to a vehicle seat is provided herein. The child seat, which may be front- and/or rear-facing, includes a seat base defining a seat portion and a backrest portion. The seat base can receive an untensioned belt to secure the child seat to a vehicle seat in an untensioned configuration. A tensioning mechanism attached to the backrest portion and is rotatable between a first position substantially adjacent to the backrest portion and a second position disposed therefrom. In the second position, the tensioning mechanism can receive a portion of the belt. In the first position, the tensioning mechanism applies tension to the portion of the received belt to secure the child seat to the vehicle seat in a tensioned configuration. Methods of manufacturing child seats are also provided herein.

17 Claims, 21 Drawing Sheets

(56) References Cited

U.S. PATENT DOCUMENTS

| | | |
|---|---|---|
| 5,791,359 A | 8/1998 | Lin et al. |
| 5,810,435 A | 9/1998 | Surot |
| 5,839,789 A | 11/1998 | Koledin |
| 5,902,015 A | 5/1999 | Allcock |
| 5,979,982 A | 11/1999 | Nakagawa |
| 6,024,408 A | 2/2000 | Bello et al. |
| 6,053,532 A | 4/2000 | Wilkins et al. |
| 6,092,869 A | 7/2000 | Ziv |
| 6,139,099 A | 10/2000 | Skold et al. |
| 6,152,528 A | 11/2000 | Van Montfort |
| 6,170,911 B1 | 1/2001 | Kassai et al. |
| 6,508,510 B2 | 1/2003 | Yamazaki |
| 6,539,590 B2 | 4/2003 | Ziv |
| 6,672,664 B2 | 1/2004 | Yanaka et al. |
| 6,779,842 B2 | 8/2004 | McNeff |
| 6,902,194 B2 | 6/2005 | Russell et al. |
| 7,029,068 B2 | 4/2006 | Yoshida et al. |
| 7,059,676 B2 | 6/2006 | McNeff |
| 7,163,265 B2 | 1/2007 | Adachi |
| 7,195,315 B2 | 3/2007 | Rikhof |
| 7,258,189 B2 | 8/2007 | Kohama |
| 7,261,376 B2 | 8/2007 | Kespohl |
| 7,300,113 B2 | 11/2007 | Baloga et al. |
| 7,753,445 B2 | 7/2010 | Kassai et al. |
| 7,866,703 B2 | 1/2011 | Spahn et al. |
| 8,262,161 B2 | 9/2012 | Fritz et al. |
| 8,550,555 B2 | 10/2013 | Fritz et al. |
| 8,573,695 B2 | 11/2013 | Van Geer et al. |
| 8,690,244 B2 | 4/2014 | Fritz et al. |
| 8,845,022 B2 | 9/2014 | Strong et al. |
| 2001/0004163 A1 | 6/2001 | Yamazaki |
| 2002/0043838 A1 | 4/2002 | Yanaka et al. |
| 2003/0127894 A1* | 7/2003 | McNeff ............... B60N 2/2806 297/250.1 |
| 2004/0070246 A1 | 4/2004 | Adachi |
| 2004/0232747 A1* | 11/2004 | Yamazaki ........... B60N 2/2806 297/250.1 |
| 2005/0146183 A1* | 7/2005 | Langmaid ........... B60N 2/2806 297/256.1 |
| 2005/0184567 A1* | 8/2005 | Carpenter ........... B60N 2/2806 297/256.16 |
| 2006/0006714 A1 | 1/2006 | Van Geer et al. |
| 2006/0091709 A1* | 5/2006 | Emmert ............... B60N 2/2878 297/256.16 |
| 2011/0272983 A1 | 11/2011 | Fritz et al. |
| 2012/0007397 A1 | 1/2012 | Fritz et al. |
| 2012/0007398 A1 | 1/2012 | Fritz et al. |
| 2013/0119732 A1* | 5/2013 | Wuerstl ............... B60N 2/2806 297/253 |

FOREIGN PATENT DOCUMENTS

| | | | |
|---|---|---|---|
| AU | 1 821 800 A | 6/2000 | |
| AU | 2 982 301 A | 11/2001 | |
| AU | 2001-29823 B2 | 11/2001 | |
| AU | 2003-296874 A1 | 6/2004 | |
| CA | 2049739 A1 | 2/1992 | |
| CA | 2084321 A1 | 6/1993 | |
| CA | 2247597 A1 | 3/2000 | |
| CA | 2526156 A1 | 1/2005 | |
| CN | 1100692 A | 3/1995 | |
| CN | 2209069 Y | 10/1995 | |
| CN | 2247113 Y | 2/1997 | |
| DE | 295 13 774 U1 | 1/1996 | |
| DE | 297 15 020 UI | 11/1997 | |
| DE | 197 22 096 A1 | 12/1998 | |
| EP | 0 200 411 A2 | 12/1986 | |
| EP | 0 323 334 A1 | 7/1989 | |
| EP | 0 732 235 A2 | 9/1996 | |
| EP | 0 816 161 A1 | 1/1998 | |
| EP | 0 822 115 A2 | 2/1998 | |
| EP | 0853018 A1 | 7/1998 | |
| EP | 0 931 693 A2 | 7/1999 | |
| EP | 1077152 A2 * | 2/2001 | ........... B60N 2/2806 |
| EP | 1110806 A1 | 6/2001 | |
| EP | 1 199 213 A1 | 4/2002 | |
| EP | 1232902 A2 * | 8/2002 | ........... B60N 2/2806 |
| EP | 1 344 678 A2 | 9/2003 | |
| EP | 1344678 A2 | 9/2003 | |
| EP | 1369296 A1 | 12/2003 | |
| EP | 1 403 131 A2 | 3/2004 | |
| EP | 1418085 A1 | 5/2004 | |
| EP | 1 199 213 B1 | 9/2005 | |
| EP | 1 623 868 A1 | 2/2006 | |
| EP | 1 623 892 B1 | 2/2008 | |
| EP | 1 623 868 B1 | 4/2008 | |
| EP | 1 997 671 A2 | 12/2008 | |
| EP | 1 407 922 B1 | 3/2009 | |
| EP | 1 110 806 B2 | 4/2009 | |
| EP | 2080664 A1 | 7/2009 | |
| EP | 1 612 091 B1 | 12/2009 | |
| EP | 2322379 A1 | 5/2011 | |
| FR | 2 735 001 A1 | 12/1996 | |
| JP | 2001180348 A | 7/2001 | |
| JP | 2002-316565 A | 10/2002 | |
| WO | WO 97/39913 A1 | 10/1997 | |
| WO | WO 98/06289 A1 | 2/1998 | |
| WO | WO 00/09367 A2 | 2/2000 | |
| WO | WO 00/21803 A1 | 4/2000 | |
| WO | WO 00/30886 A2 | 6/2000 | |
| WO | WO 2004/033251 A1 | 4/2004 | |
| WO | WO 2005/000625 A2 | 1/2005 | |

OTHER PUBLICATIONS

Office Action for U.S. Appl. No. 13/602,846; dated Feb. 5, 2014.
U.S. Appl. No. 13/602,846, filed Sep. 4, 2012; first named inventor: Strong.
Office Action and translation from Korean Intellectual Property Office for corresponding Korean Application No. 10-2014-0144267, mailed Nov. 17, 2015, all enclosed pages cited.
Office Action and translation from Korean Intellectual Property Office for corresponding Korean Application No. 10-2013-0105120, mailed Nov. 23, 2015, all enclosed pages.
Office Action and translation from Patent Office of the Russian Federation for corresponding Russian Application No. 201339691/11, mailed Oct. 7, 2014, all enclosed pages cited.
Office Action and translation from Korean Intellectual Property Office for corresponding Korean Application No. 10-2013-0105120, mailed Oct. 17, 2014, all enclosed pages cited.
Office action from Korean patent application No. 10-2013-0105120 mailed Apr. 28, 2015, all enclosed pages cited.
Office action from U.S. Appl. No. 14/273,804 mailed May 26, 2015, all enclosed pages cited.
Office action from Chinese patent application No. 201310398750.4 mailed Jun. 15, 2015, all enclosed pages cited.
Search Report from Chinese patent application No. 201310398750.4 mailed Jun. 15, 2015, all enclosed pages cited.
Office Action of corresponding Korean application No. 10-2014-0144267 mailed May 9, 2016, all enclosed pages cited.
Extended European Search Report and Written Opinion of co-pending application No. 14003614.6 mailed Mar. 5, 2015, all enclosed pages cited.
Office Action of corresponding Canadian application No. 2,825,694 mailed Dec. 15, 2014, all enclosed pages cited.
Patent Examination Report No. 1 of co-pending Australian application No. 2013221904 mailed Mar. 13, 2015, all enclosed pages cited.
Examination report of corresponding Australian application No. 2014240201 mailed Jul. 12, 2016, all enclosed pages cited.
Office Action of corresponding Chinese application No. 201410573558.9 mailed May 27, 2016, all enclosed pages cited.

* cited by examiner

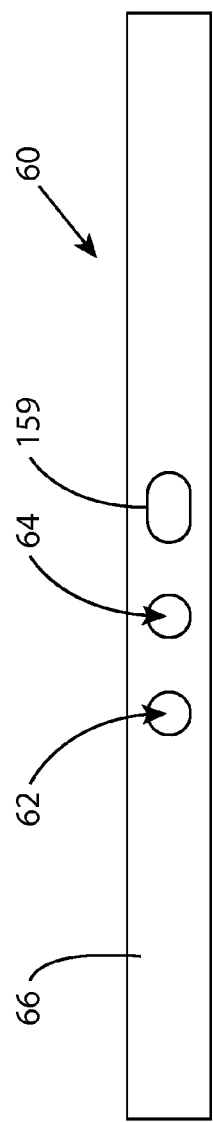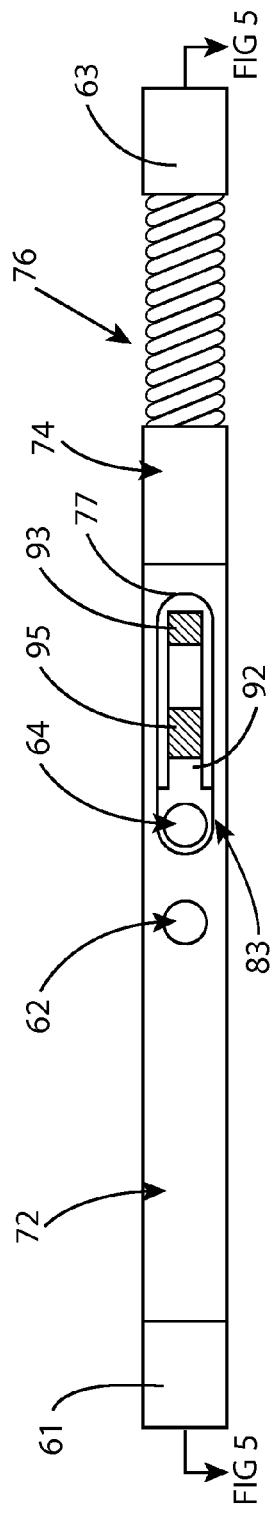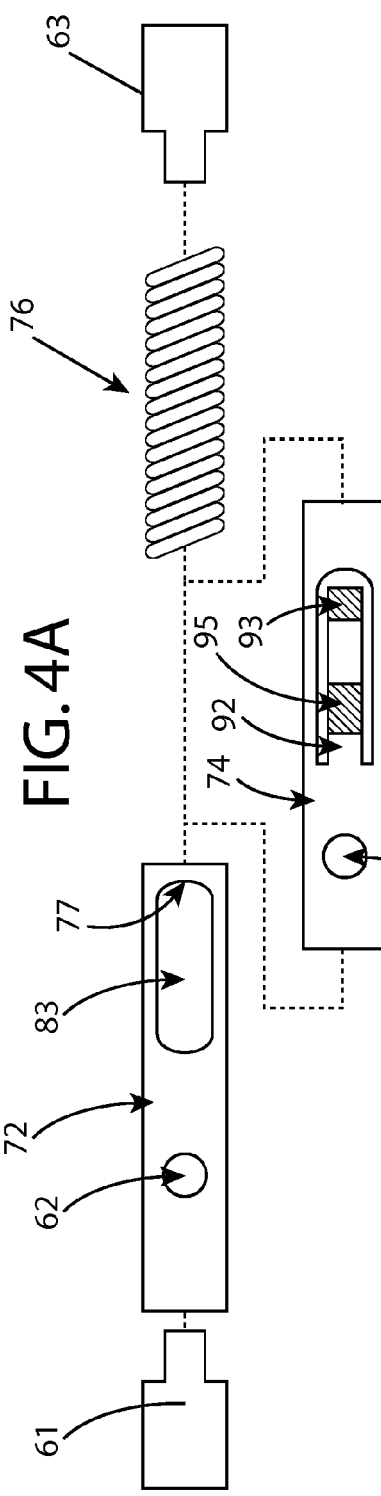
FIG. 4
FIG. 4A
FIG. 4B

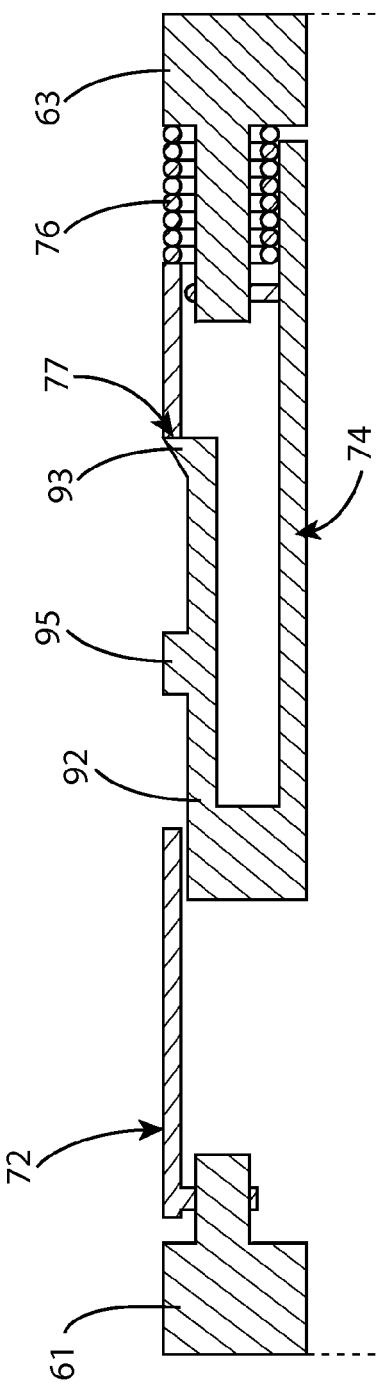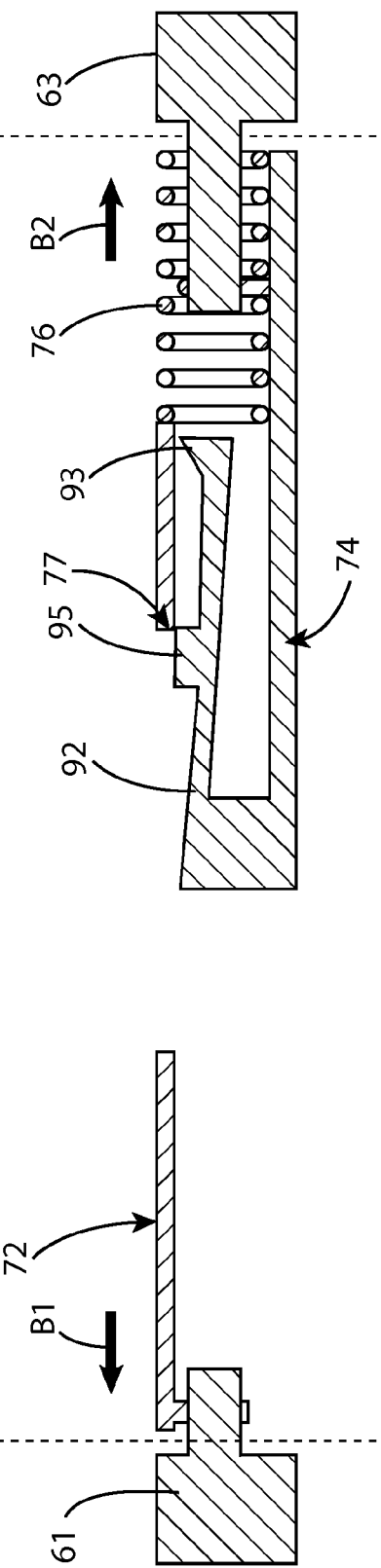

FORWARD AND REARWARD FACING CHILD SEAT WITH BELT TENSIONING MECHANISM FOR IMPROVED INSTALLATION

TECHNICAL FIELD

The present invention generally relates to the field of child safety seats, and more particularly, to a child safety seat that may be used in either a forward facing or rearward facing orientation and includes a tensioning mechanism for applying tension to a seat belt to more fully secure the child safety seat to a vehicle seat, thereby providing for easier installation of the child safety seat to the vehicle seat.

BACKGROUND

Child safety seating products are designed to protect children in vehicles from the effects of impacts or other sudden changes in motion (e.g., sudden deceleration). Child safety seats, commonly referred to simply as child seats, may be used in a variety of vehicles with a variety of seating orientations. For example, it is often recommended for the youngest children to use rear-facing child seats for additional safety, while forward-facing seats can be used when the child reaches an appropriate size. It is important for a child seat to be properly secured to the vehicle seat to protect the occupant, particularly during an impact.

SUMMARY

Some child safety seats are secured to a vehicle seat with the seat belt of the vehicle. In such situations, securing the child seat may be awkward and difficult. Moreover, maintaining a proper amount of tension in the seat belt can also be difficult. Indeed, an improper amount of tension is undesirable and may negatively affect the safety of the occupant secured within the child seat. It would be advantageous to have an easy-to-use and secure child seat that may be used in either a forward-facing or rear-facing configuration depending on the parents' needs.

Example embodiments of the present invention include a child seat that may be secured to a vehicle seat in both a rear-facing and front-facing orientation. The child seat may define a seat base that may define a seat portion and a backrest portion. The seat base may be designed to receive a seat belt from a vehicle seat and secure the child seat to the vehicle seat in an untensioned configuration. The seat belt may secure the child seat to the vehicle seat by using a tensioning mechanism that is attached to the seat base. In some embodiments, the tensioning mechanism may be moved between a first position that is adjacent to the seat base and a second position that is displaced from the seat base. The second position of the tensioning mechanism may allow the seat belt to be received by the seat base, while the first position holds the belt in a tensioned configuration. Moving the tensioning mechanism from the second position to the first position may apply the tension to the belt. The child seat may be able to receive the belt and apply tension to it when the child seat is in either or both of a rear-facing and front-facing orientation.

In some embodiments, the tensioning mechanism may rotate between the first and second positions. By receiving a substantially vertical force, the tensioning mechanism may rotate from the second position to the first position and apply tension to the belt.

In some embodiments, the seat base may define a first edge and a second edge. The first and second edges may be configured to receive the belt and thereby define a first belt path spanning the first and second edges. Additionally, each of the first and second edges may have an inlet and a retaining channel, such that each inlet channel may guide the belt into the respective retaining channel. In some embodiments, the seat base may receive the belt so as to define the first belt path when the child seat is in the rear-facing orientation. The seat base may define a second belt path spanning the first and second edges when the child seat is in the front-facing configuration. In some embodiments, first belt path may be defined between the tensioning mechanism and the seat base at a position proximate an intermediate region of the seat portion. The second belt path may be defined between the tensioning mechanism and the seat base at a position proximate an intersection of the seat portion and backrest portion of the seat base.

Additionally, in some embodiments, a force for moving the tensioning mechanism from the second position to the first position while the belt is in the first belt path is substantially similar to a force for moving the tensioning mechanism from the second position to the first position while the belt is in the second belt path. The resulting tension applied to the belt in the first belt path may be substantially similar to the resulting tension applied to the belt in the second belt path.

Additionally, in some embodiments, the tensioning mechanism may comprise an engaging surface that is adjacent a surface of the seat base when the tension mechanism is in the first position. A portion of the first belt path corresponding to the first and second edges may be positioned higher than a portion of the first belt path corresponding to the engaging surface of the tensioning mechanism, such that a portion of the belt engaged by the engaging surface may be deflected substantially towards the seat base with respect to portions of the belt engaged by the first and second edges when the tensioning mechanism is in the first position.

In some embodiments, the seat base may provide an open belt path, such that the seat base is configured to receive an edge of the belt when the tensioning mechanism is in the second position while the belt is in a buckled position with the vehicle seat.

Additionally, in some embodiments, the child seat may comprise a harness defining a first harness portion and a second harness portion. The first harness portion and the second harness portion may each be configured to rotate with the tensioning mechanism between the first position and the second position, such that the harness may be displaced away from the first belt path when the tension mechanism is moved from the first position to the second position.

In some embodiments, the seat base may define opposing side portions, where each side portion may comprise a lock receiving portion. The tensioning mechanism may further comprise a locking mechanism comprising two laterally-opposing locking members configured to translate between an extended position and a retracted position. Each lock receiving portion may be configured to receive a respective locking member when the tensioning mechanism is in the first position and the locking members are in the extended position, thereby locking the tensioning mechanism in the first position. The locking members may also be configured to automatically translate to the extended position when the tensioning mechanism is rotated from the second position to the first position.

In some embodiments, the belt may define a lap section and a shoulder section. The seat base may be configured to receive a portion of the lap section and a portion of the shoulder section of the belt in an untensioned state to secure the child seat to the vehicle seat in an untensioned configuration.

In another example embodiment, a child seat may be configured to be secured to a vehicle seat. The child seat may comprise a seat base defining a seat portion and a backrest portion. The seat base may be configured to receive a belt of a vehicle seat in an untensioned state to secure the child seat to the vehicle seat in an untensioned configuration. The seat base may further define a first edge and a second edge. The seat base may be configured to receive the belt so as to define a belt path spanning the first and second edges. Additionally, each of the first and second edges may comprise an inlet channel and a retaining channel such that the belt path may extend from the retaining channel in the first edge to the retaining channel in the second edge. The inlet channels of the first and second edge may then guide the belt into the retaining channels.

Some embodiments may include a tensioning mechanism attached to the backrest portion of the seat base. The tensioning mechanism may be rotatable between a first position substantially adjacent to the seat base and a second position displaced therefrom. Placing the tensioning mechanism in the second position may allow the seat base to receive the belt, and the movement of the tensioning mechanism from the second position to the first position may apply tension to the belt to secure the child seat to the vehicle seat in a tensioned configuration. The tensioning mechanism may be configured to rotate, in response to receiving a substantially vertical force, from the second position to the first position to apply tension to the belt to secure the child seat to the vehicle seat in a tensioned configuration. The belt path may be defined between the tensioning mechanism and the seat base at a position proximate the center of the seat portion, so as to position the child seat in a rear-facing orientation. Alternatively, the belt path may be defined between the tensioning mechanism and the seat base at a position proximate the intersection of the backrest portion and seat portions, so as to position the child seat in a front-facing orientation.

The seat base may further define opposing side portions, each of which may comprise a lock receiving portion. The tensioning mechanism may further comprise a locking mechanism comprising two laterally-opposing locking members configured to translate between an extended position and a retracted position. Each lock receiving portion may be configured to receive a respective locking member when the tensioning mechanism is in the first position and the locking members are in the extended position, thereby locking the tensioning mechanism in the first position. In some embodiments, the locking members may be configured to automatically translate to the extended position when the tensioning mechanism is rotated from the second position to the first position.

In yet another example embodiment, a method may be defined for manufacturing a child seat configured to be secured to a vehicle seat in both a rear-facing orientation and a front-facing orientation. The method may comprise providing a seat base defining a seat portion and a backrest portion. In some embodiments of the method, the seat base may be configured to receive a belt of the vehicle seat in an untensioned state to secure the child seat to the vehicle seat in an untensioned configuration. The method may comprise attaching a tensioning mechanism to the seat base, and the tensioning mechanism may be rotatable between a first position substantially adjacent to the seat base and a second position displaced therefrom. Placing the tensioning mechanism in the second position may allow the seat base to receive the belt, and the movement of the tensioning mechanism from the second position to the first position may apply tension to the belt to secure the child seat to the vehicle seat in a tensioned configuration. The seat base of the child seat may be configured to receive the belt in both a rear-facing and front-facing orientation. The seat base may define a first edge and a second edge. The seat base may be configured to receive the belt so as to define a first belt path spanning the first and second edges. Each of the first and second edges may further comprise an inlet channel and a retaining channel, and each inlet channel may be configured to guide a portion of the belt into the respective retaining channel.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 shows a top view of a locking mechanism for the tensioning mechanism shown in FIG. 3, in accordance with an example embodiment of the present invention described herein;

FIG. 4A shows a top view of the locking mechanism shown in FIG. 4 with the outer sleeve of the locking mechanism removed, in accordance with an example embodiment of the present invention described herein;

FIG. 4B shows an exploded view of the locking mechanism shown in FIG. 4A, in accordance with an example embodiment of the present invention described herein;

FIG. 5 shows a cross-sectional view of the locking mechanism shown in FIG. 4A with the locking members of the locking mechanism in the retracted position, in accordance with an example embodiment of the present invention described herein;

FIG. 5A shows a cross-sectional view of the locking mechanism shown in FIG. 4A with the locking members of the locking mechanism in the extended position, in accordance with an example embodiment of the present invention described herein;

Figure 6:
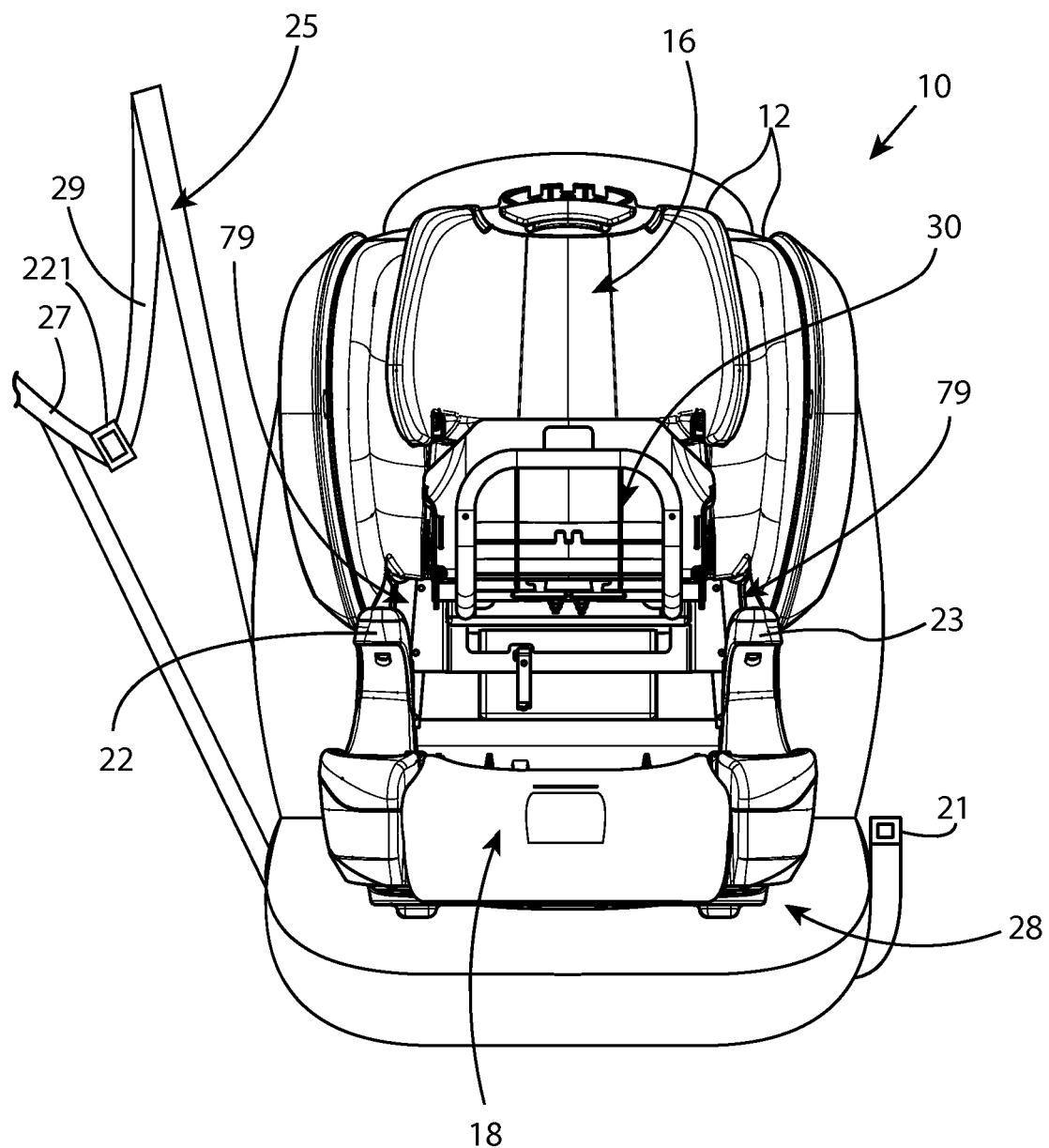
FIG. 6 shows a front view of the child seat shown in FIG. 3, wherein the child seat is positioned on a vehicle seat near a seat belt, in accordance with an example embodiment of the present invention described herein.
Figure 6A:
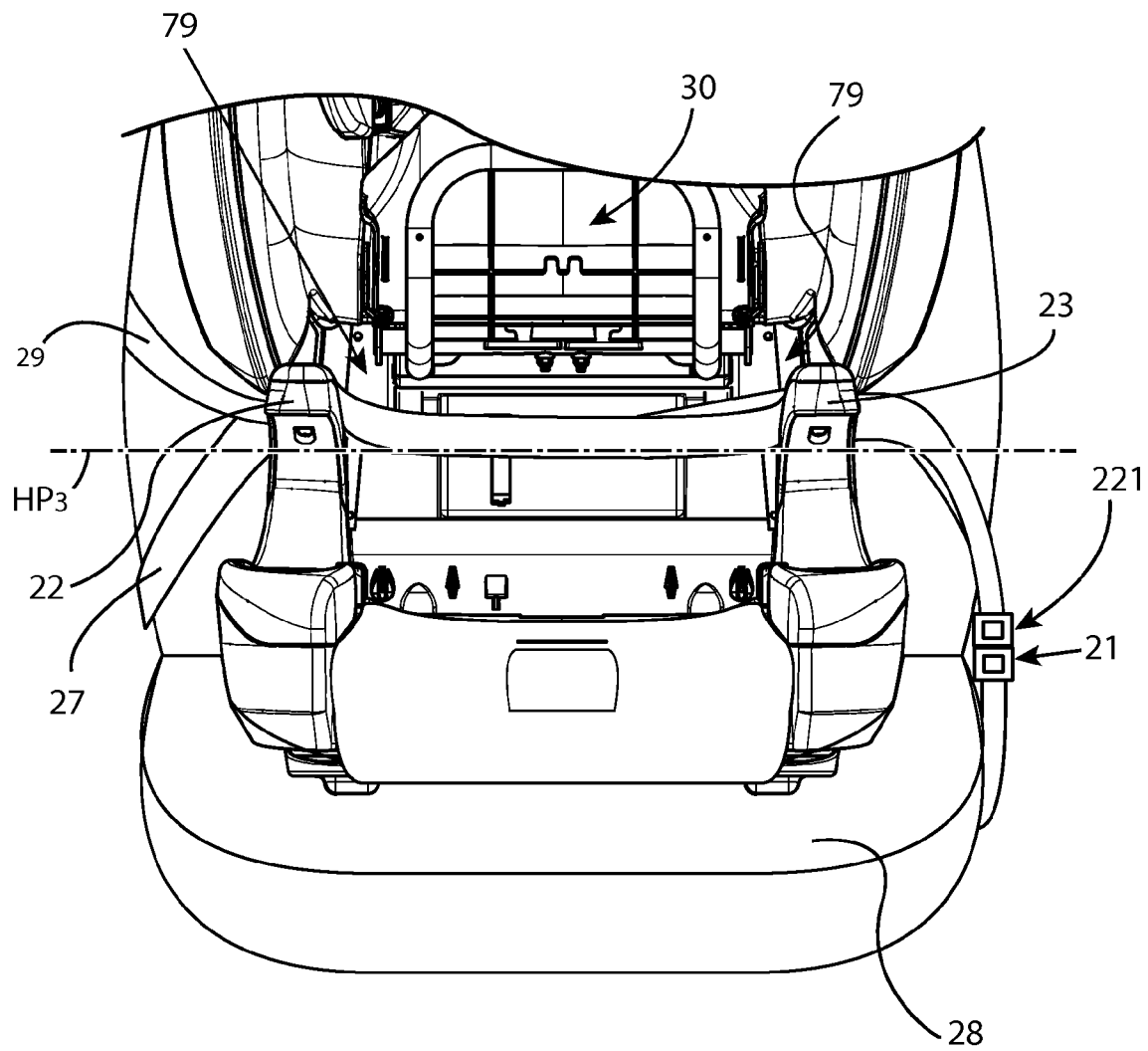
FIG. 6A shows a detailed view of the child seat shown in FIG. 6 with a portion of the seat belt positioned over the arm rests of the child seat and under the tensioning mechanism and the seat belt latched to a buckle of the vehicle seat in the untensioned configuration, in accordance with an example embodiment of the present invention described herein.
Figure 7:
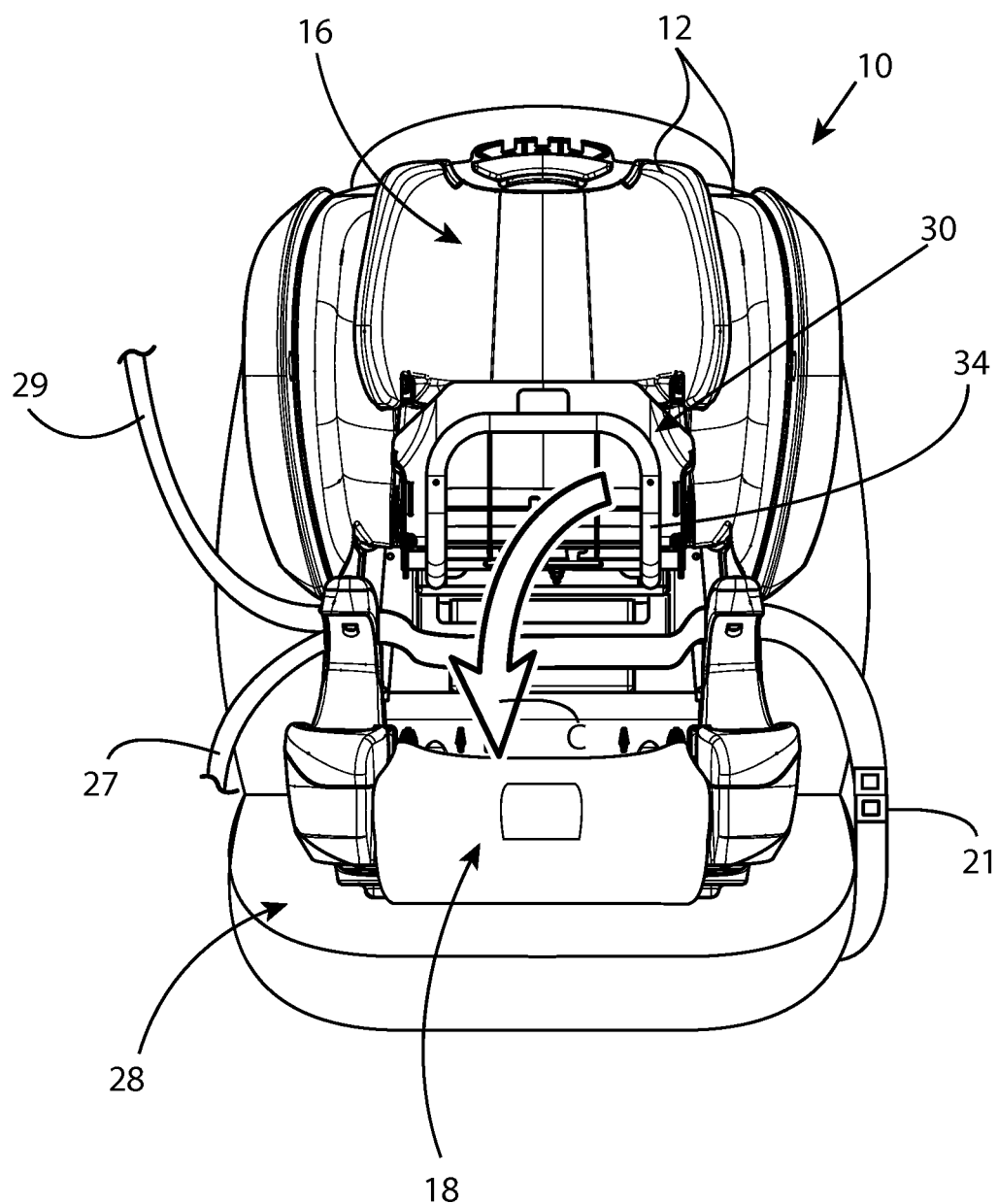
Figure 7A:
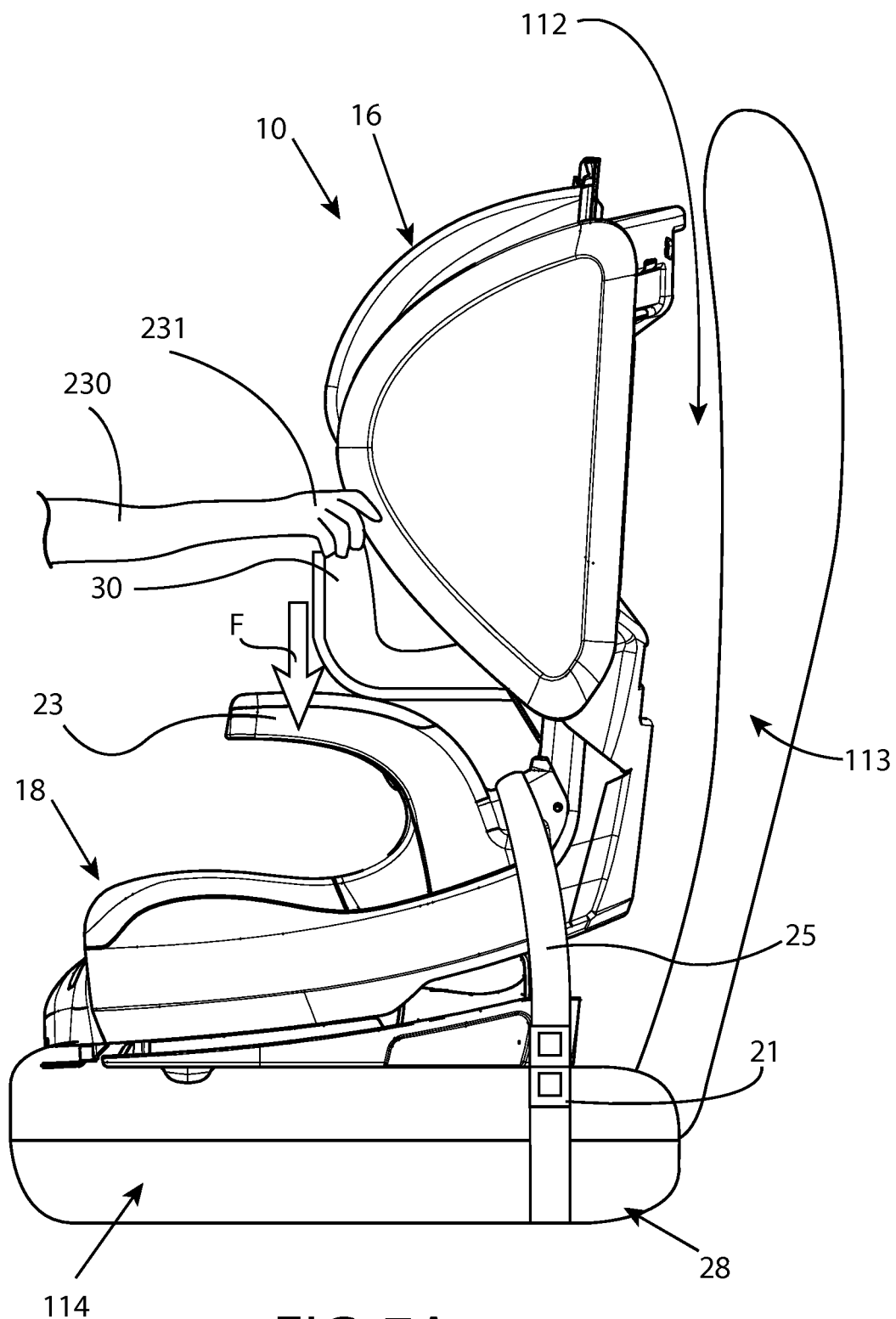
Figure 8:
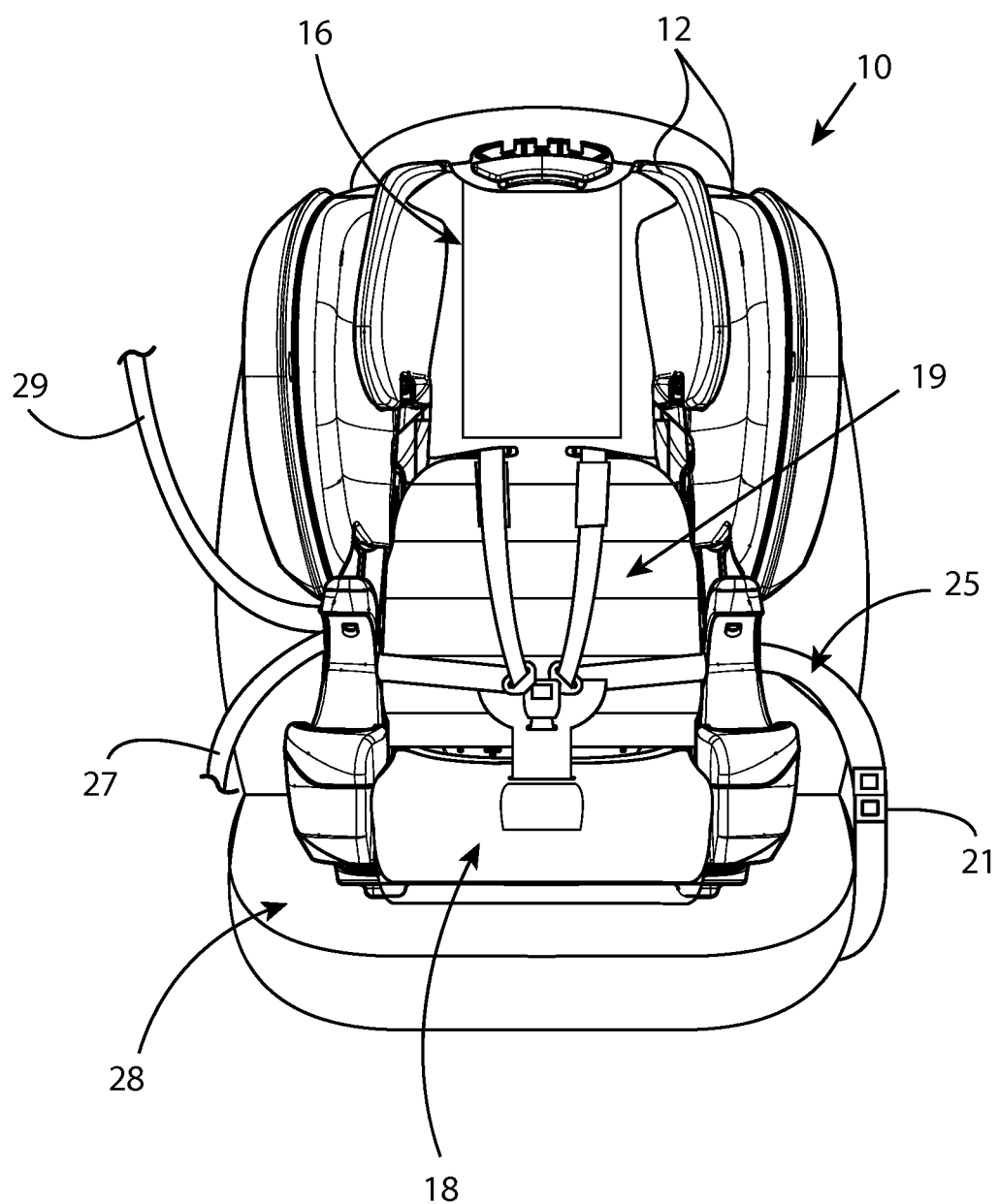
Figure 8A:
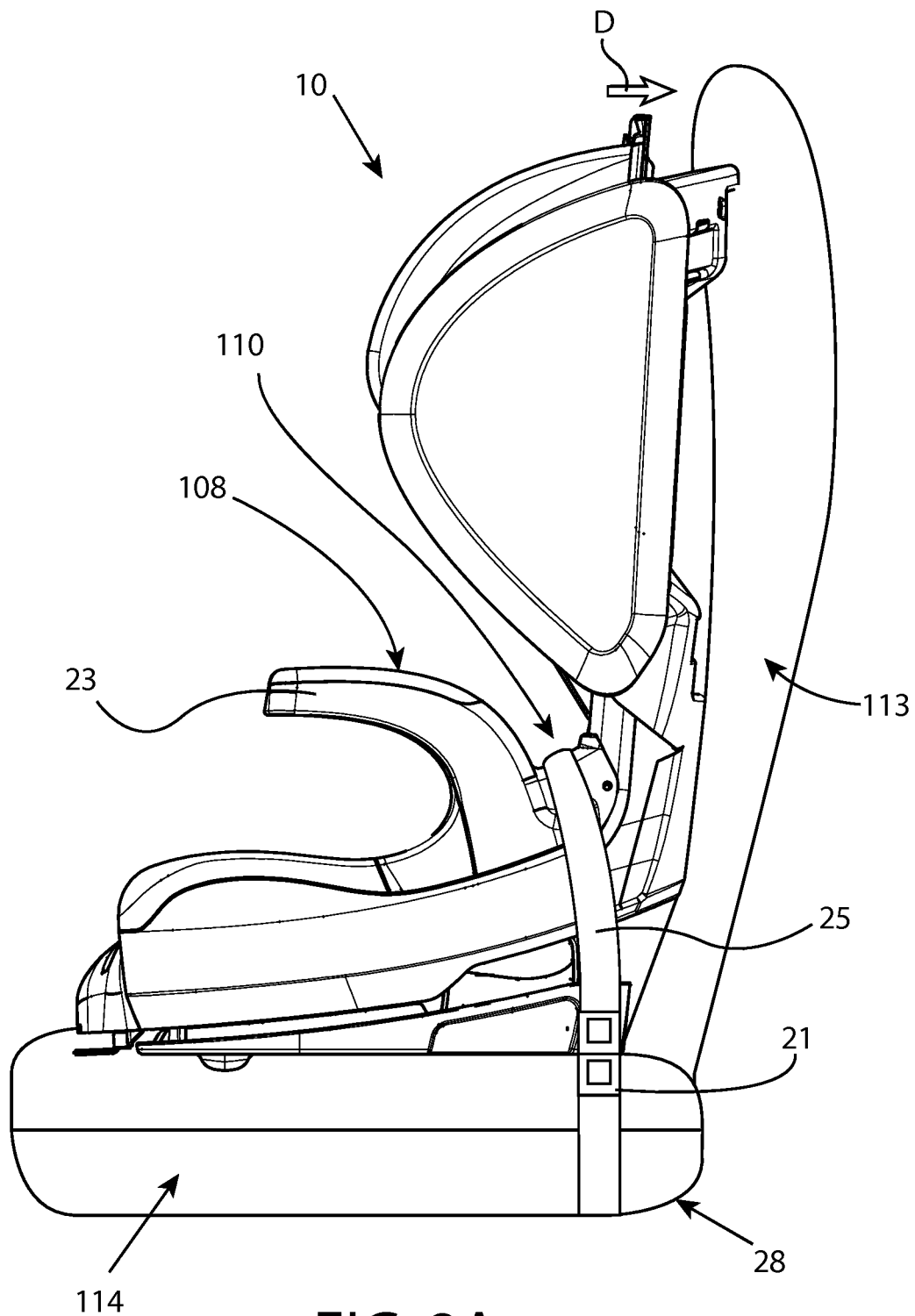
Figure 9:
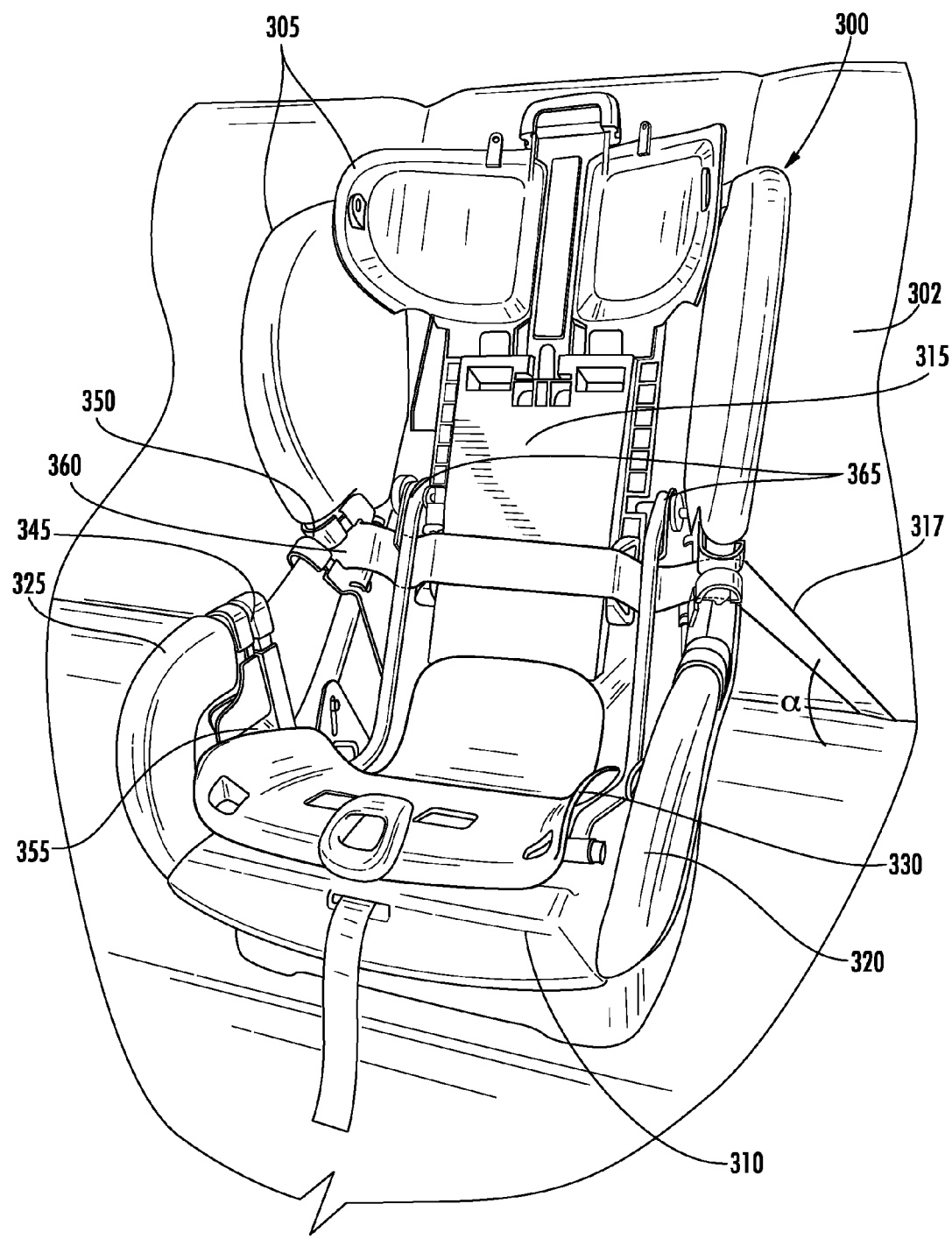
Figure 10:
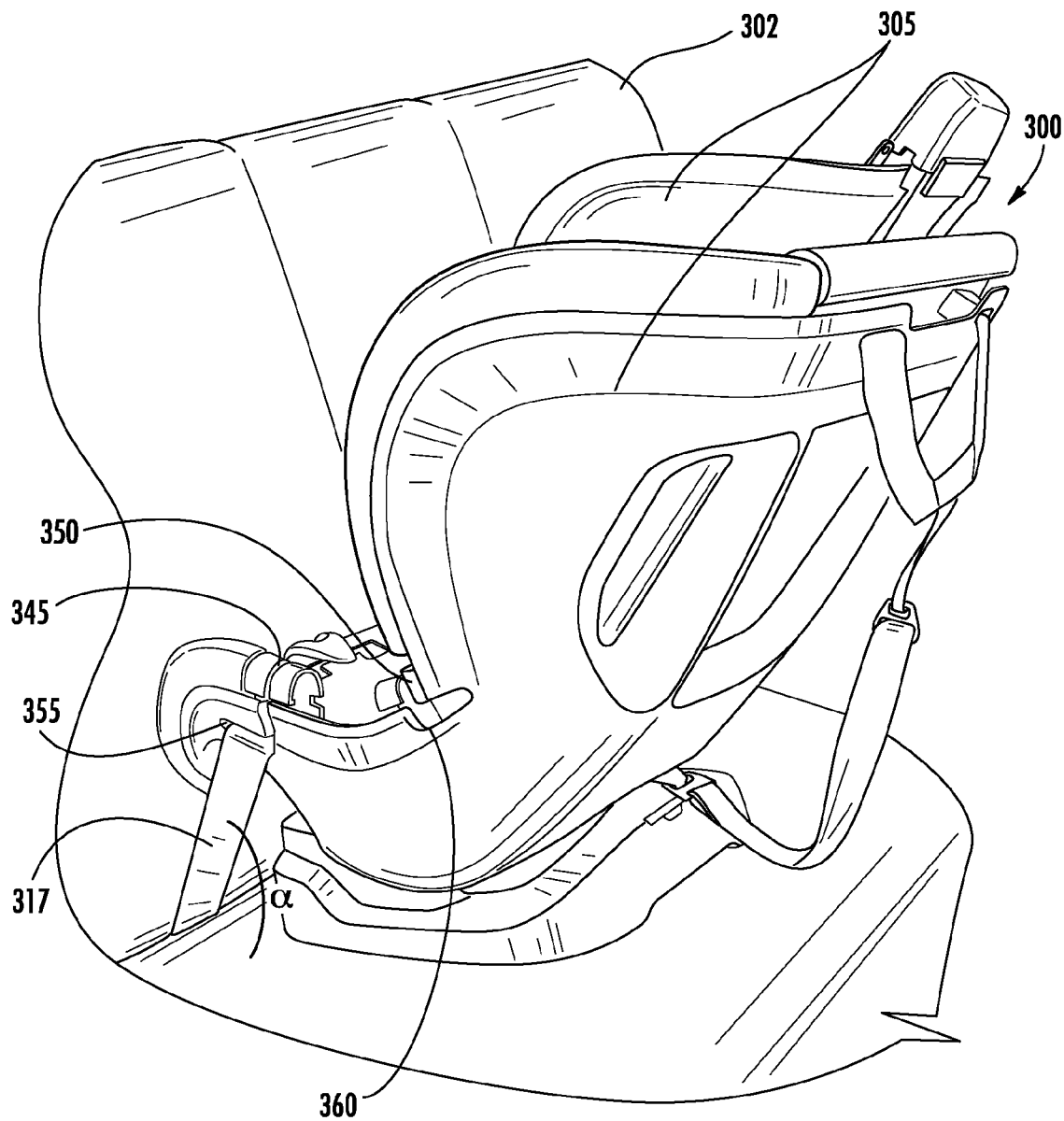
Figure 11:
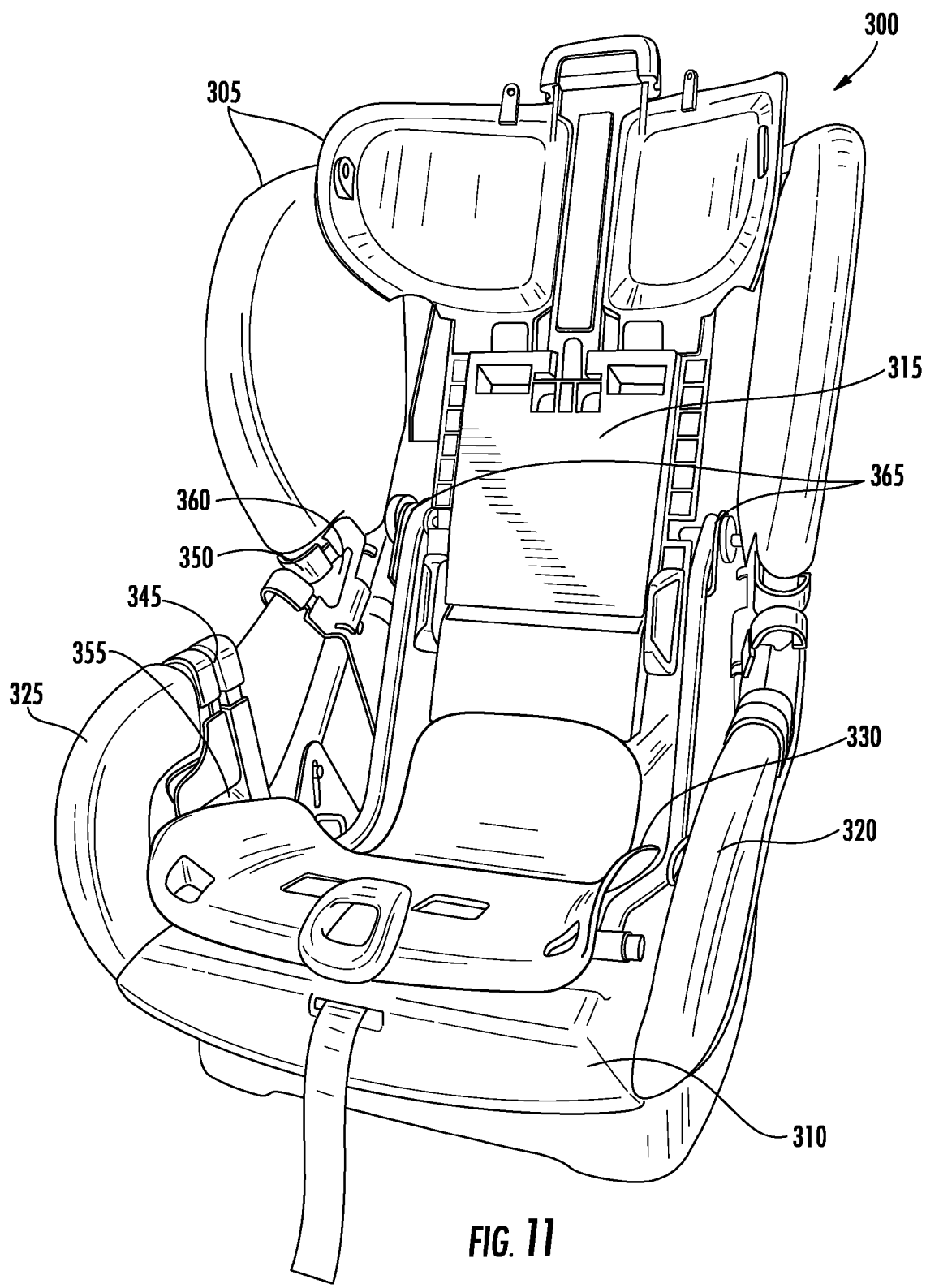
Figure 12:
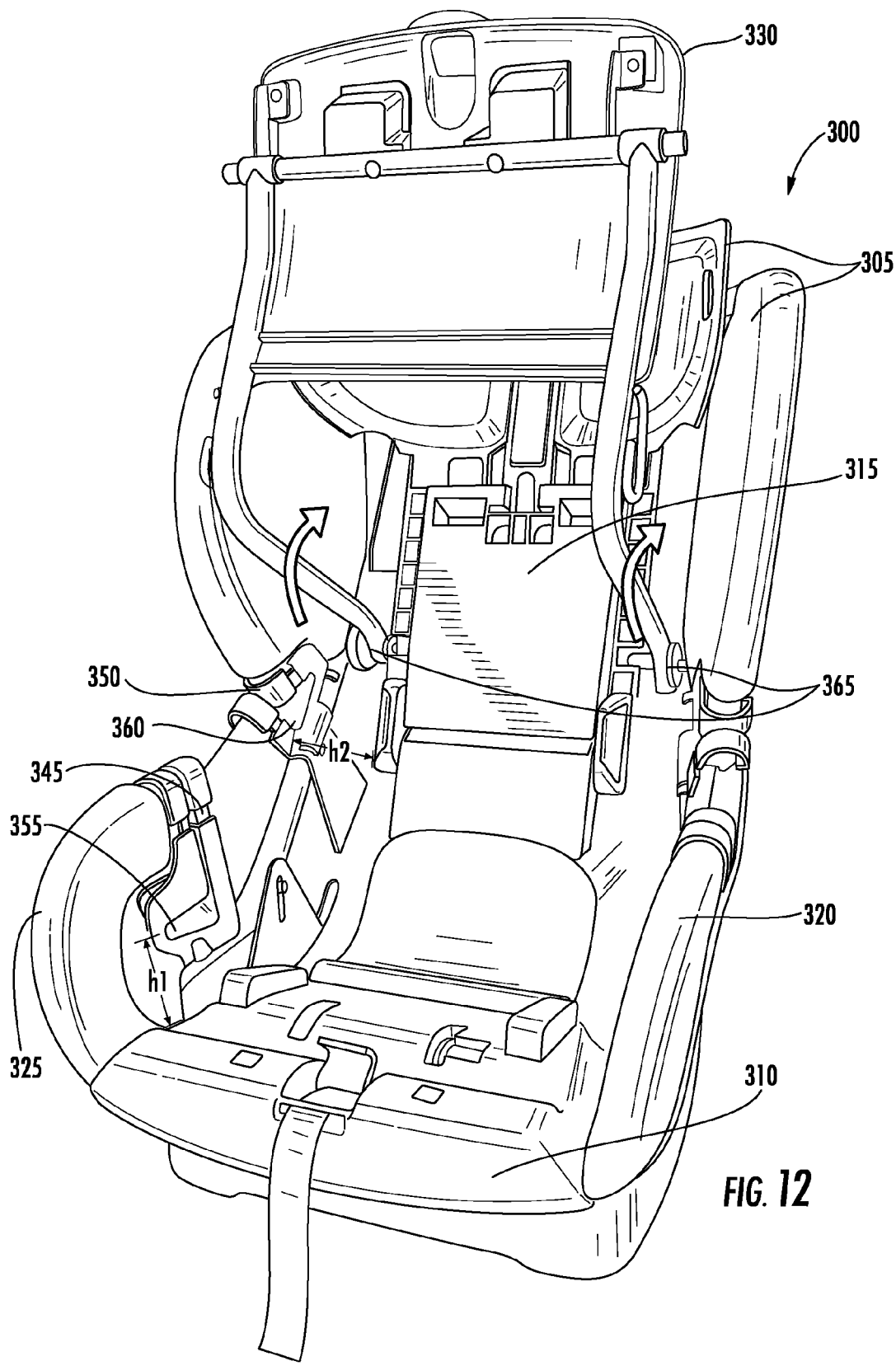
Figure 13:
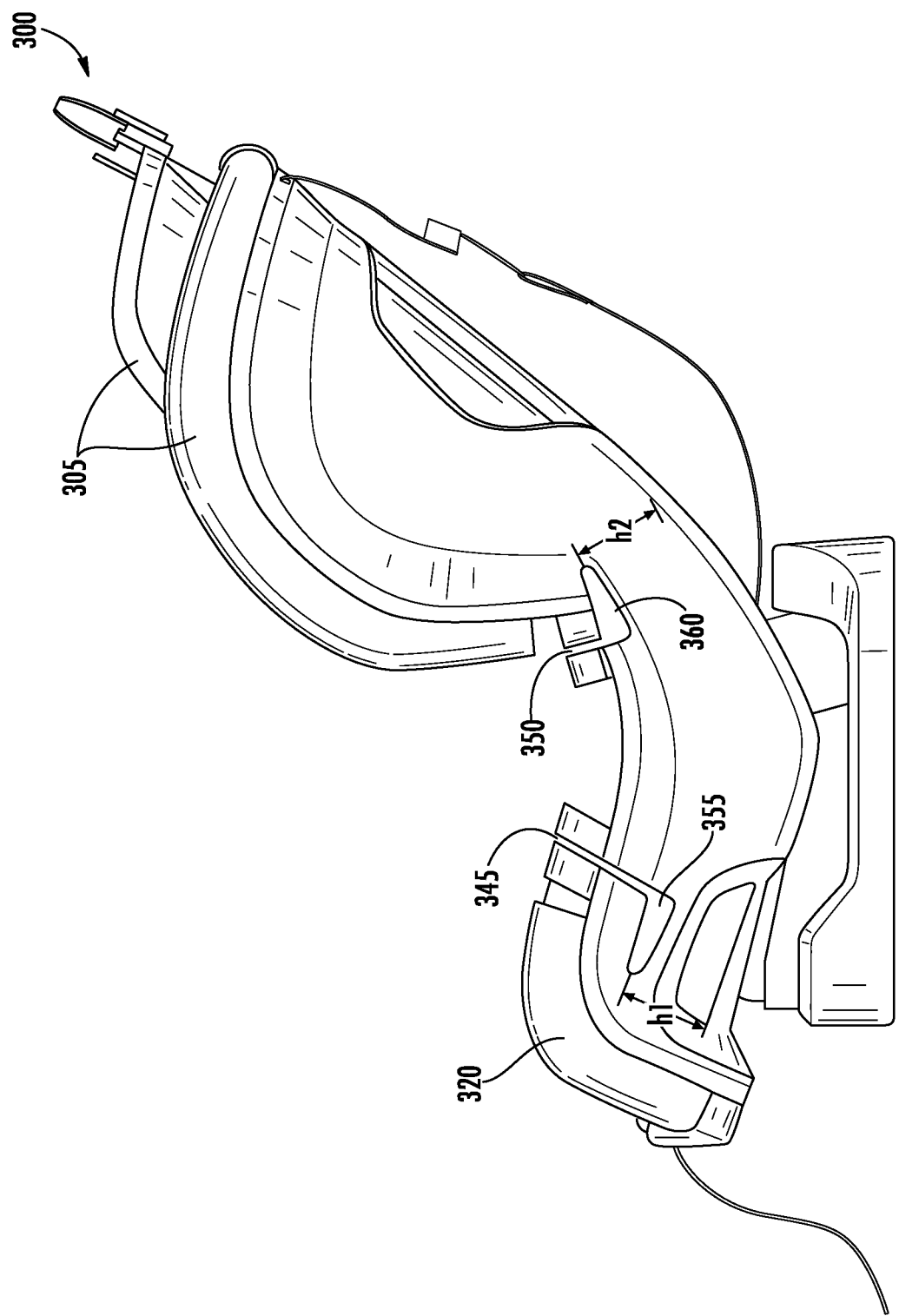
Figure 14:
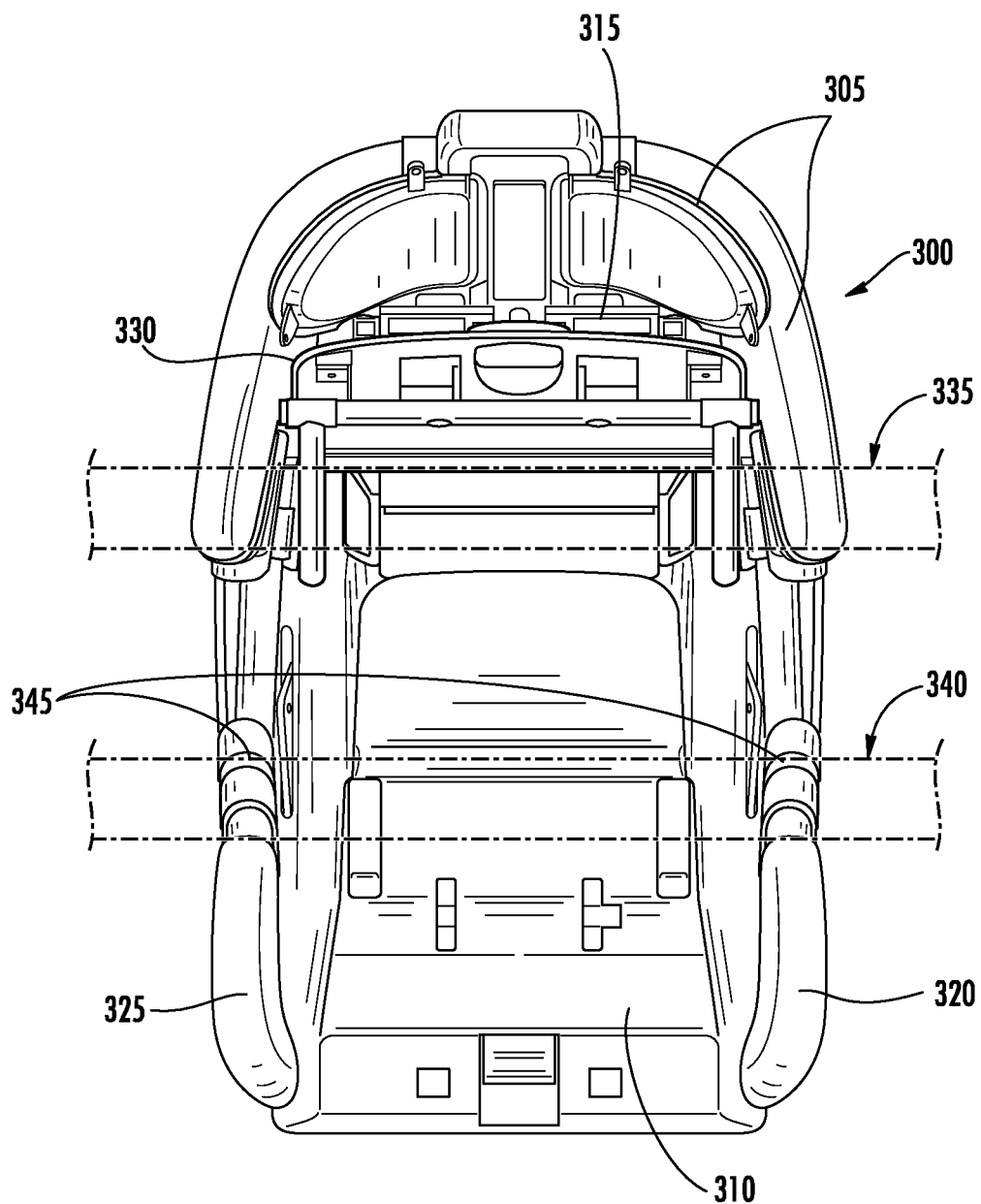
Figure 15:
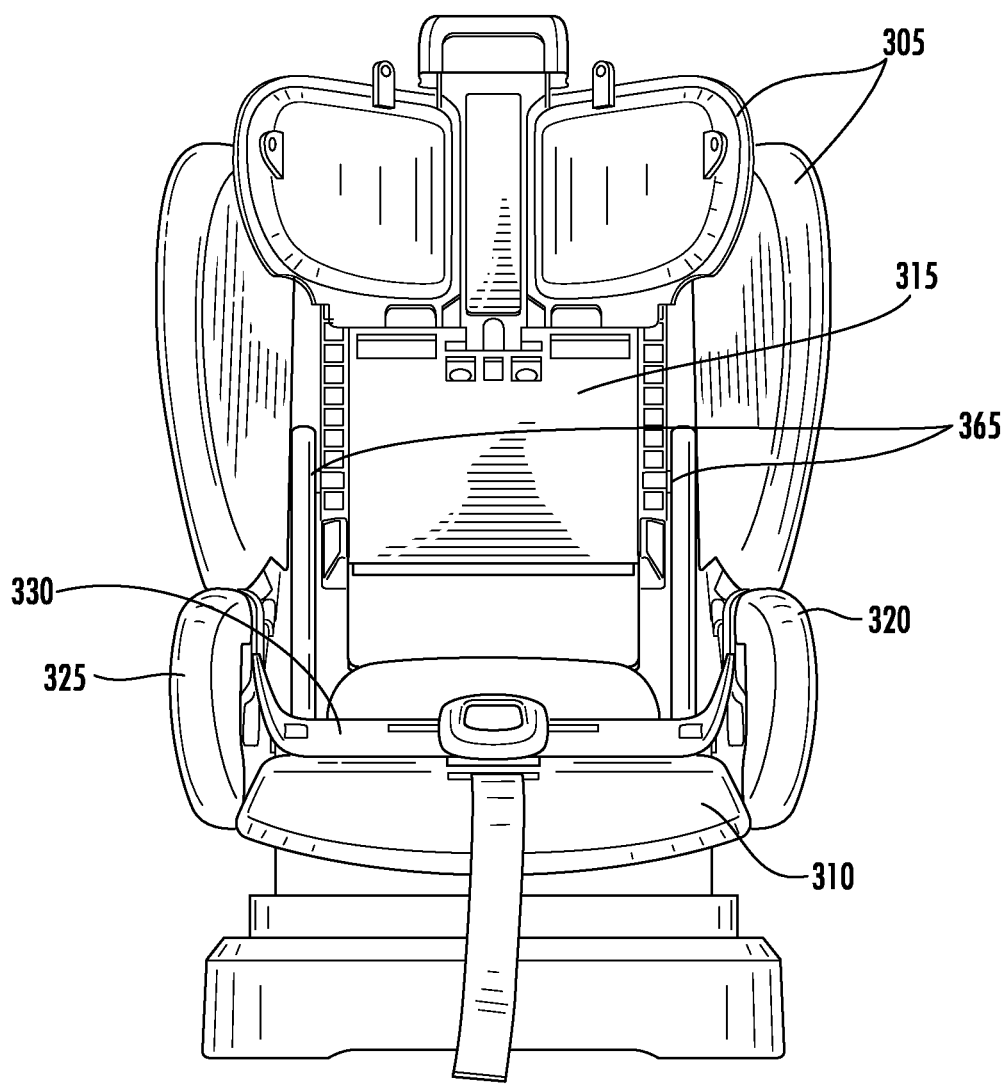

FIG. 7 shows a front view of the child seat shown in FIG. 6A with an arrow indicating rotation of the tensioning mechanism after the seat belt has been positioned over the arm rests of the child seat and under the tensioning mechanism and the seat belt latched to a buckle of the vehicle seat in the untensioned configuration, in accordance with an example embodiment of the present invention described herein;

FIG. 7A shows a side view the child seat shown in FIG. 7, in accordance with an example embodiment of the present invention described herein;

FIG. 8 shows a front view of the child seat shown in FIG. 7, where the tensioning mechanism has been rotated into the first position to apply tension to the seat belt to secure the child seat to the vehicle seat in a tensioned configuration, in accordance with an example embodiment of the present invention described herein;

FIG. 8A shows a side view the child seat shown in FIG. 8, in accordance with an example embodiment of the present invention described herein;

FIG. 9 shows a perspective view of another example embodiment of the present invention described herein, where the child seat is secured to a vehicle seat in a front-facing orientation;

FIG. 10 shows a perspective view of another example embodiment of the present invention described herein, where the child seat is secured to a vehicle seat in a rear-facing orientation;

FIG. 11 shows a perspective view of the child seat according to an example embodiment of the present invention described herein;

FIG. 12 shows a perspective view of the child seat shown in FIG. 11 where the tensioning mechanism has been rotated into the second position in accordance with an example embodiment of the present invention described herein;

FIG. 13 shows a side view of the child seat shown in FIG. 11 in accordance with an example embodiment of the present invention described herein;

FIG. 14 shows a top view of the child seat shown in FIG. 11 showing two belt paths in accordance with several example embodiments of the present invention described herein; and FIG. 15 shows a front view of the child seat shown in FIG. 11 in accordance with an example embodiment of the present invention described herein.

DETAILED DESCRIPTION OF THE INVENTION

The present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The terms "first" and "second" are used for reference purposes only and are not limiting. The disclosure of U.S. patent application Ser. No. 13/602,846 is incorporated herein by reference in its entirety.

A child safety seat may be configured for installation in either a front-facing or rear-facing orientation with respect to the vehicle seat to accommodate children in the appropriate position based on the height and weight of a child, such as according to the guidelines and standards of the United States National Highway Transportation Safety Administration (NHTSA) and similar authorities in other countries.

In order to protect an occupant, a child safety seat must be secured to a fixed location in a vehicle. The type of securement depends on the type of vehicle and may also depend on the standards for the particular region the vehicle is being operated in. For example, a child safety seat may be secured to a vehicle using a variety of methods, including using the seat belt of the vehicle seat or LATCH (Lower Anchors and Tethers for Children) attachments in the U.S.

Proper installation and use of a child safety seat within a vehicle is necessary to achieve the maximum protection afforded by the seat. As noted above, some child safety seats are designed to secure to a vehicle seat using the seat belt of the vehicle seat. Often a seat belt can be positioned around the child seat and then fastened (e.g., latched, buckled, etc.) into a buckle attached to the vehicle to achieve secure attachment of the child seat to the vehicle. However, even when the seat belt is tightly fastened, slack in the seat belt may occur. Indeed, the seat belt may not be fully tensioned and the child seat may be loosely secured to the vehicle, which may be unsafe for an occupant. In some cases, multiple attempts to fully secure a child seat to a vehicle seat using a seat belt may be required. As such, installation of a child seat using a vehicle seat belt can be difficult and time consuming.

Accordingly, some example embodiments of the present invention provide a tensioning mechanism for easy and intuitive securing of a child seat using a vehicle seat belt. The tensioning mechanism enables a user to easily apply tension to (e.g., remove slack from) a latched seat belt during installation of the child seat to the vehicle seat. This causes the child seat to become more fully secured to the vehicle seat (e.g., the child seat enters a tensioned configuration). Additionally, embodiments of the tensioning system may be utilized in child seats configured for use in either a front-facing or rear-facing orientation with respect to the vehicle seat, including child seats that are solely front-facing, solely rear-facing, or convertible between front- and rear-facing.

Figure 1:
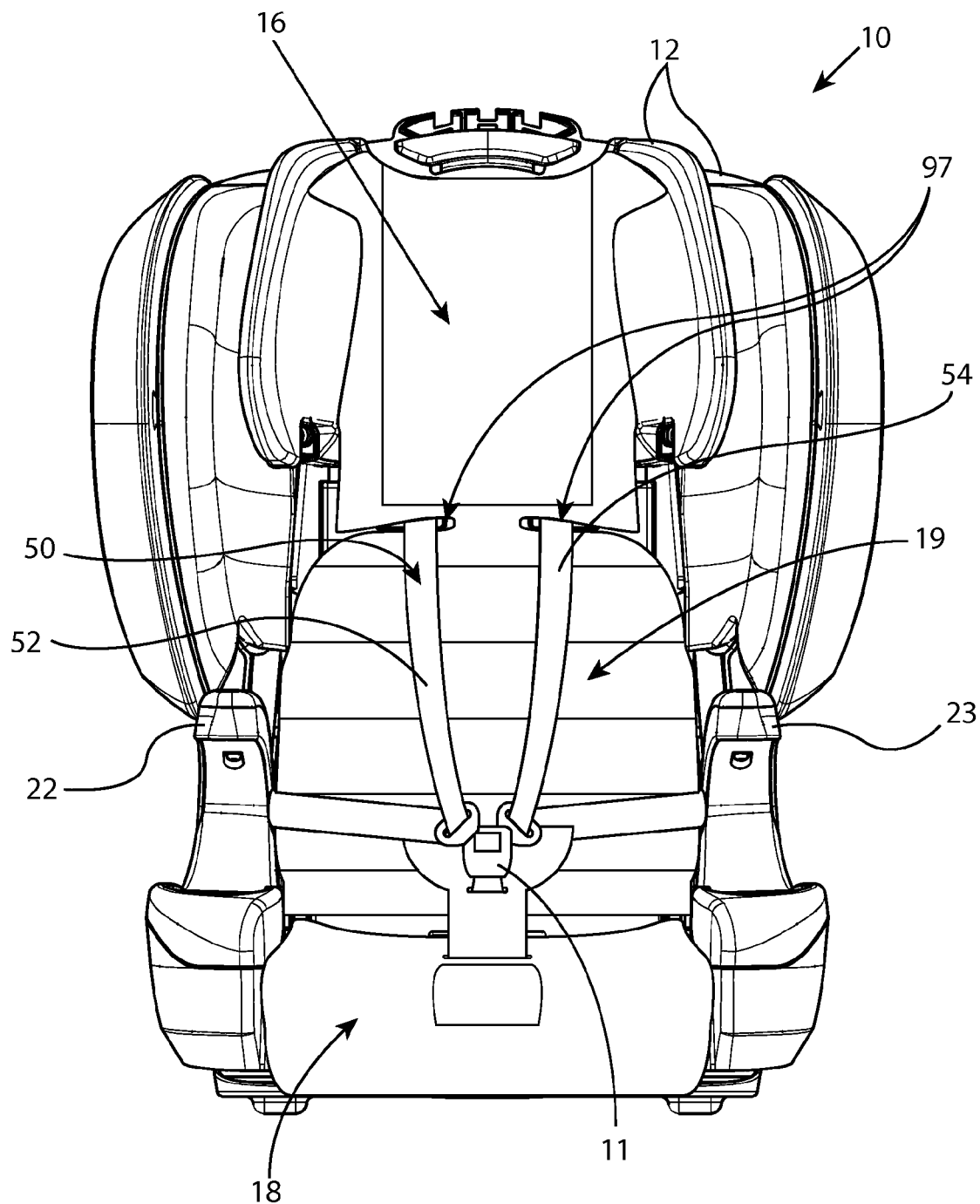
FIG. 1 shows a front view of a child safety seat, in accordance with an example embodiment of the present invention described herein.

FIG. 1 illustrates an example child safety seat 10 configured to be secured to a vehicle seat 28 (shown in FIG. 6). The child seat 10 comprises a seat base 12 defining a seat portion 18 and a backrest portion 16. The seat portion 18 and backrest portion 16 may define a seat shape that is configured to receive an occupant, such as a child. Additionally, in some embodiments, the child seat 10 may comprise a harness 50 that is configured to secure the occupant within the child seat 10. In such a manner, an occupant, such as a child (not shown), may be positioned within and secured to the child seat 10, such as for safety purposes.

Figure 1A:
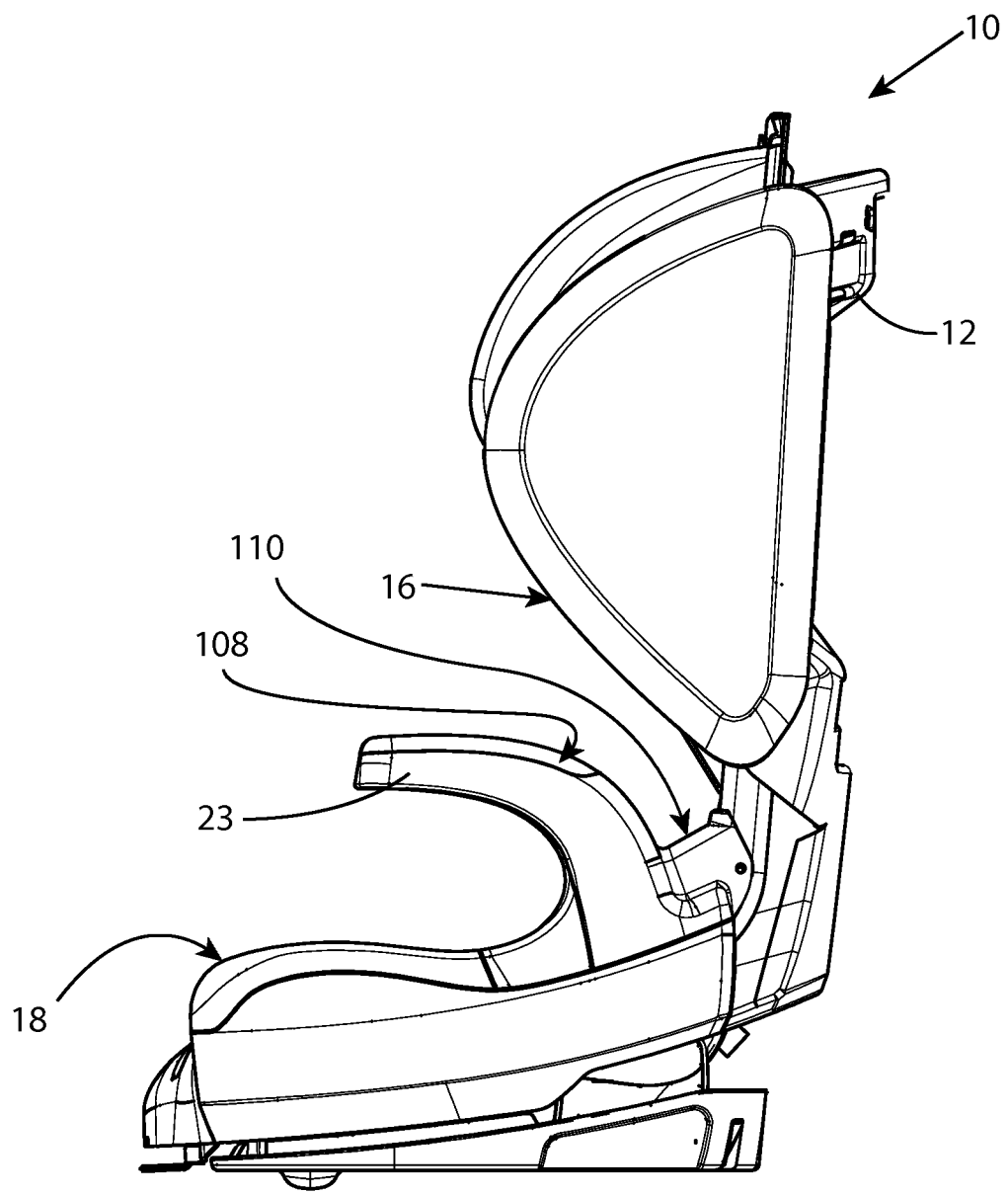
FIG. 1A shows a side view of the child safety seat shown in FIG. 1, in accordance with an example embodiment of the present invention described herein.

In some embodiments, the child seat 10 may comprise arm rests for laterally supporting the occupant. In the embodiment depicted in FIG. 1, the seat base 12 defines a first arm rest 22 and a second arm rest 23. With reference to FIG. 1A, each arm rest 22, 23 may extend outwardly from the seat base 12 to enable the occupant to rest their arms while being secured within the child seat 10.

In some embodiments, each arm rest 22, 23 may define a curved surface 108. Additionally, in some embodiments, each arm rest 22, 23 may define an angled surface 110 that extends from the backrest portion 16 of the seat base 12 downwardly at an angle (e.g., at approximately a 45° angle down from the backrest portion 16 of the seat base 12). Such features provide an aesthetic and ornamental design to the arm rest.

In some embodiments, the child seat may comprise padding, cushions, or other features to provide comfort and/or additional safety for an occupant. With reference to FIG. 1, in some embodiments, the child seat 10 may comprise a padding 19 that is attached to the backrest portion 16 of the seat base 12. As noted above, the padding 19 may provide additional support and comfort for a seat occupant. In some embodiments, the padding 19 may be configured to at least partially cover a tensioning mechanism 30 (shown in FIG. 2). Additionally, in some embodiments, the padding 19 may be configured to fold, rotate, be removed, or otherwise be displaced to reveal the tensioning mechanism 30. Additionally, as will be described in greater detail herein, in some embodiments, the padding 19 may be configured to fold as the tensioning mechanism 30 rotates from a first position to a second position.

In some embodiments, the child seat 10 may comprise a tensioning mechanism 30 that, as described in greater detail herein, is configured to enable a user to more easily secure the child seat to a vehicle seat in a tensioned configuration. In such a manner, the child seat may be more fully secured to the vehicle seat and provide optimal protection to an occupant, such as during a vehicle impact. The tensioning mechanism 30 may be pivotably attached to the backrest portion 16 of the seat base 12. In such a manner the tensioning mechanism 30 may be movable (e.g. rotatable) between a first position (shown in FIGS. 1 and 2), in which the tensioning mechanism 30 is substantially flush/aligned with the backrest portion 16, and a second position (shown in FIG. 3) in which the tensioning mechanism 30 is at least partly displaced from the backrest portion 16.

Figure 2:
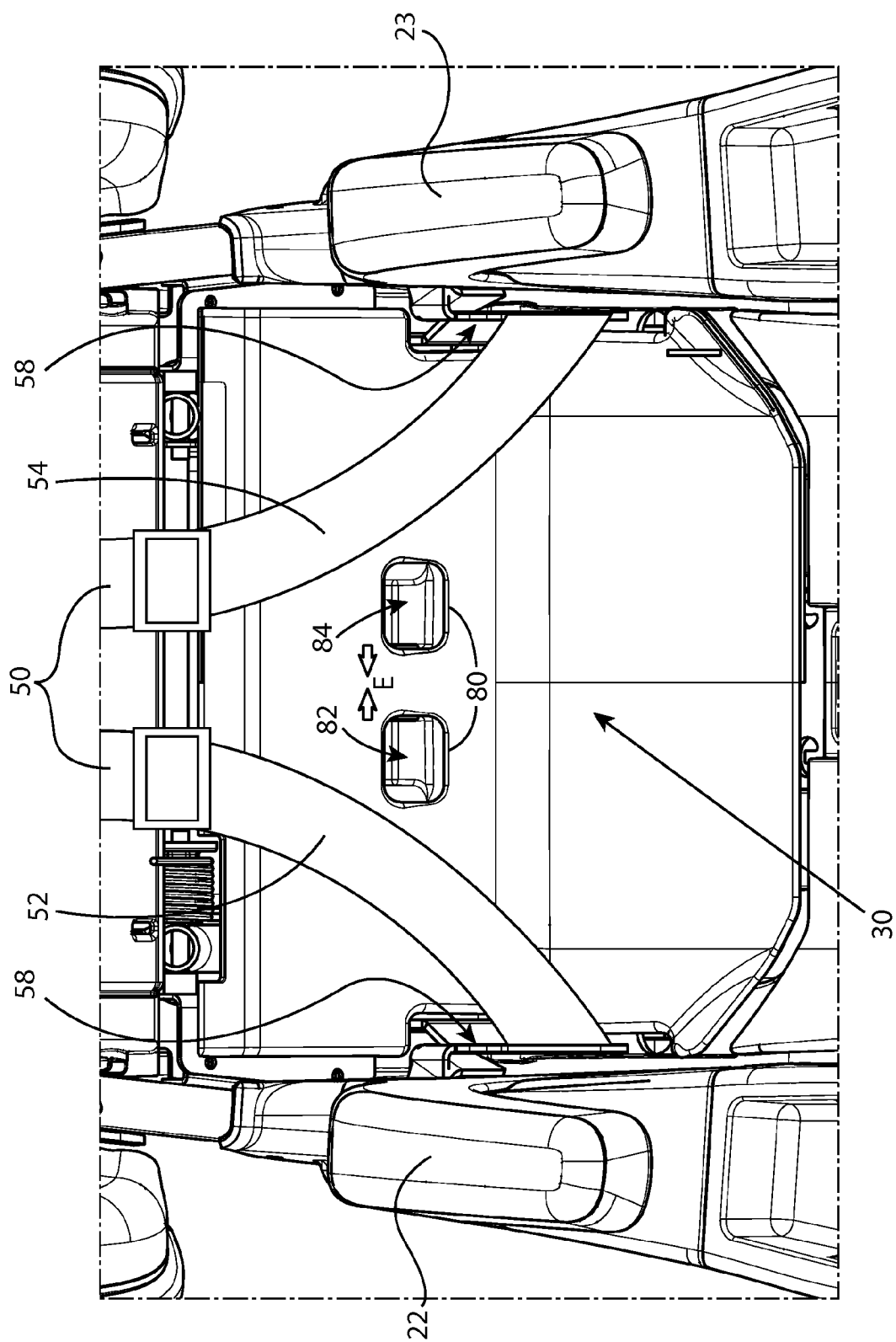
FIG. 2 shows a detailed view of a tensioning mechanism of the child seat shown in FIG. 1 with the tensioning mechanism disposed in the first position, in accordance with an example embodiment of the present invention described herein.

With reference to FIG. 1, the padding 19 may be removed or folded upward to reveal the tensioning mechanism 30. As shown in FIG. 2, the tensioning mechanism 30 is disposed in the first position which, in the depicted embodiment, is substantially adjacent to the backrest portion 16 of the seat base 12. In such an embodiment, in the first position, the tensioning mechanism 30 is fully contained within the profile of the seat base 12, thereby keeping the tensioning mechanism 30 from protruding into the space of the child seat 10 reserved for the occupant.

In some embodiments, the tensioning mechanism 30 may be configured to enable a user to rotate the tensioning mechanism 30 out of the first position from within the backrest portion 16 of the seat base 12. In the depicted embodiment, the tensioning mechanism 30 comprises a latch 80 that is configured to enable a user to rotate the tensioning mechanism 30 from the first position toward the second position. The latch 80 may define two pockets 82, 84 that are each configured to receive a finger of a user. The two pockets 82, 84 may be further configured to translate toward each other to enable a user to interact with the tensioning mechanism 30, such as to rotate the tensioning mechanism 30 from the first position to the second position.

In some embodiments, as will be described in greater detail herein, the latch 80 may be configured to enable a user to retract or otherwise unlock the locking members 61, 63 of a locking mechanism 60 (shown in FIG. 4A) to release the tensioning mechanism 30 from the first position. The two pockets 82, 84 of the latch 80 may be configured to translate toward each other to retract or otherwise unlock the locking members 61, 63. Then, due to a bias, such as from spring 91 shown in FIG. 3B, the tensioning mechanism 30 may automatically rotate out of the first position and into the second position. In such example embodiments, the user may not be required to manually rotate the tensioning mechanism 30 and may simply retract or otherwise unlock the locking members 61, 63 to release the tensioning mechanism 30.

As noted with respect to FIG. 1, in some embodiments, the child seat 10 may comprise a harness 50. The harness 50 may define a first harness portion 52 and a second harness portion 54. The first harness portion 52 and second harness portion 54 may attach or otherwise engage the seat base 12 at a first end 97. Additionally, with reference to FIG. 2, the first harness portion 52 and second harness portion 54 may also attach or otherwise engage the tensioning mechanism 30 at a second end 58. The harness 50 may be configured to surround an occupant, such as a child (not shown), who is positioned within the child seat 10. Additionally, the harness 50 may be configured to latch to a harness buckle 11 (shown in FIG. 1) connected to the child seat 10 (e.g., the seat base 12) to secure the occupant to the child seat 10.

Figure 3:
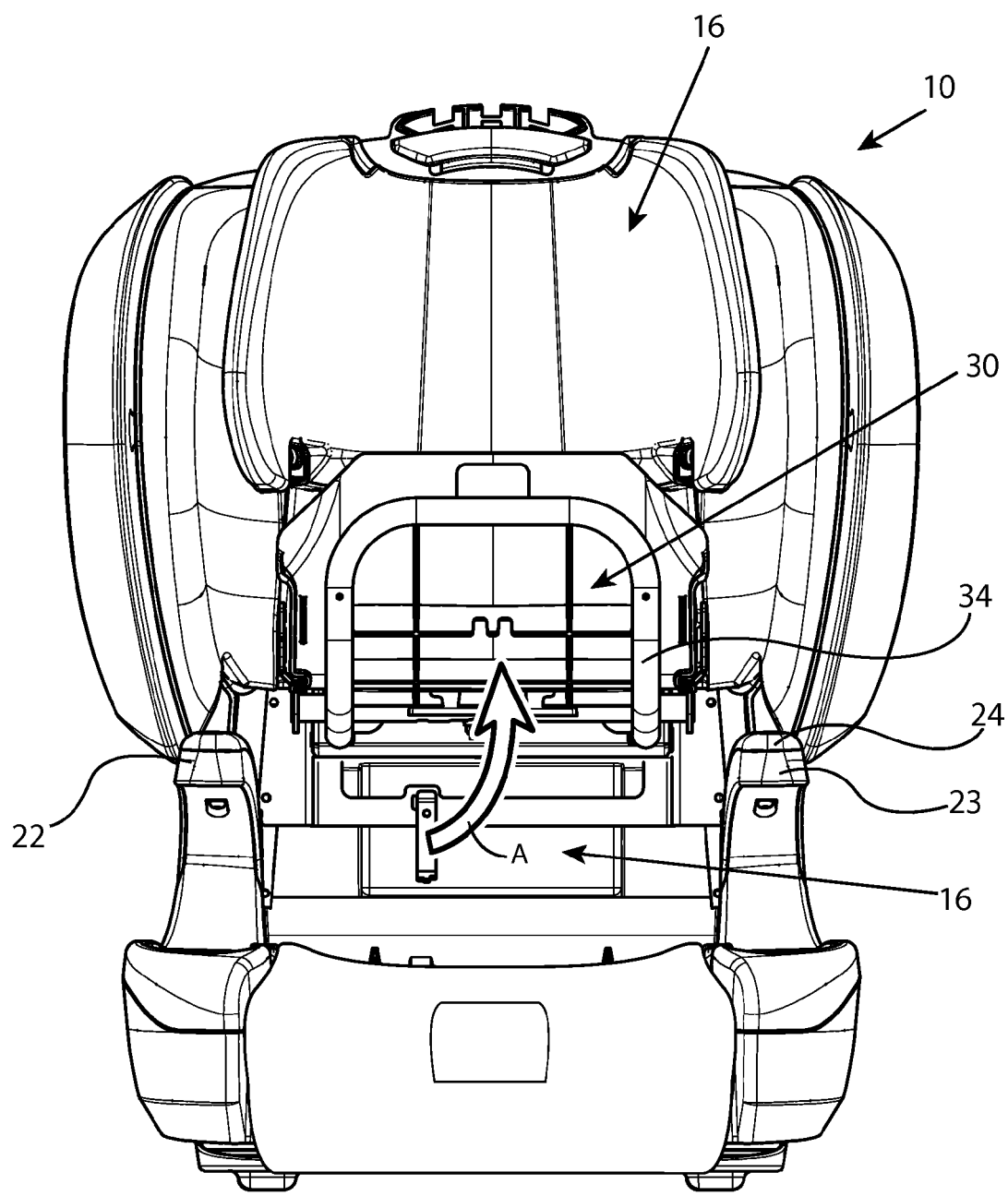
FIG. 3 shows a front view of the child seat shown in FIG. 1, where the tensioning mechanism has been rotated into the second position, in accordance with an example embodiment of the present invention described herein.

In some embodiments, the tensioning mechanism 30 may be configured to rotate from a first position to a second position. With reference to FIG. 3, the tensioning mechanism 30 may be rotated (e.g., in the direction of arrow A) from the first position substantially adjacent to the backrest portion 16 of the seat base 12 (FIGS. 1 and 2) to the second position (FIG. 3). In the depicted embodiment, the tensioning mechanism 30 is disposed away from the backrest portion 16 of the seat base 12 when in the second position.

In embodiments of the child seat with a harness 50, the harness 50 may define a first harness portion 52 and a second harness portion 54 that each extend from the backrest portion 16 of the seat base 12 at a first end 97 (shown in FIG. 1) to a second end 58 fixedly attached to the tensioning mechanism 30 (shown in FIG. 2). Being fixedly attached to the tensioning mechanism 30, the second end 58 and the harness 50 may rotate with the tensioning mechanism 30 between the first position and the second position. In such a manner, the harness 50, including the first harness portion 52 and the second harness portion 54, and the second end 58 may be removed from the area below the tensioning mechanism 30. Additionally, in some embodiments, the padding 19 may also be folded up with the harness 50 and, thus, may also be removed from the area below the tensioning mechanism 30. As described in greater detail herein, such a feature enables a user to have clear and easy access to the belt guide channel 79 and belt path (shown in FIG. 3A) and allows for easy positioning of the seat belt 25 (shown in FIG. 6) under the tensioning mechanism 30.

As noted herein, some embodiments of the present invention provide a tensioning mechanism for applying tension to a seat belt of a vehicle to more fully secure the child seat with the vehicle. In the depicted embodiment of FIG. 3, the tensioning mechanism 30 has been rotated into the second position to provide an area for a user to position a seat belt of a vehicle under the tensioning mechanism 30 for securing the child seat 10 to the vehicle. Positioning and engagement of the seat belt of the vehicle will be described in greater detail herein with respect to FIGS. 6, 6A, 7, 7A, 8, and 8A.

Figure 3A:
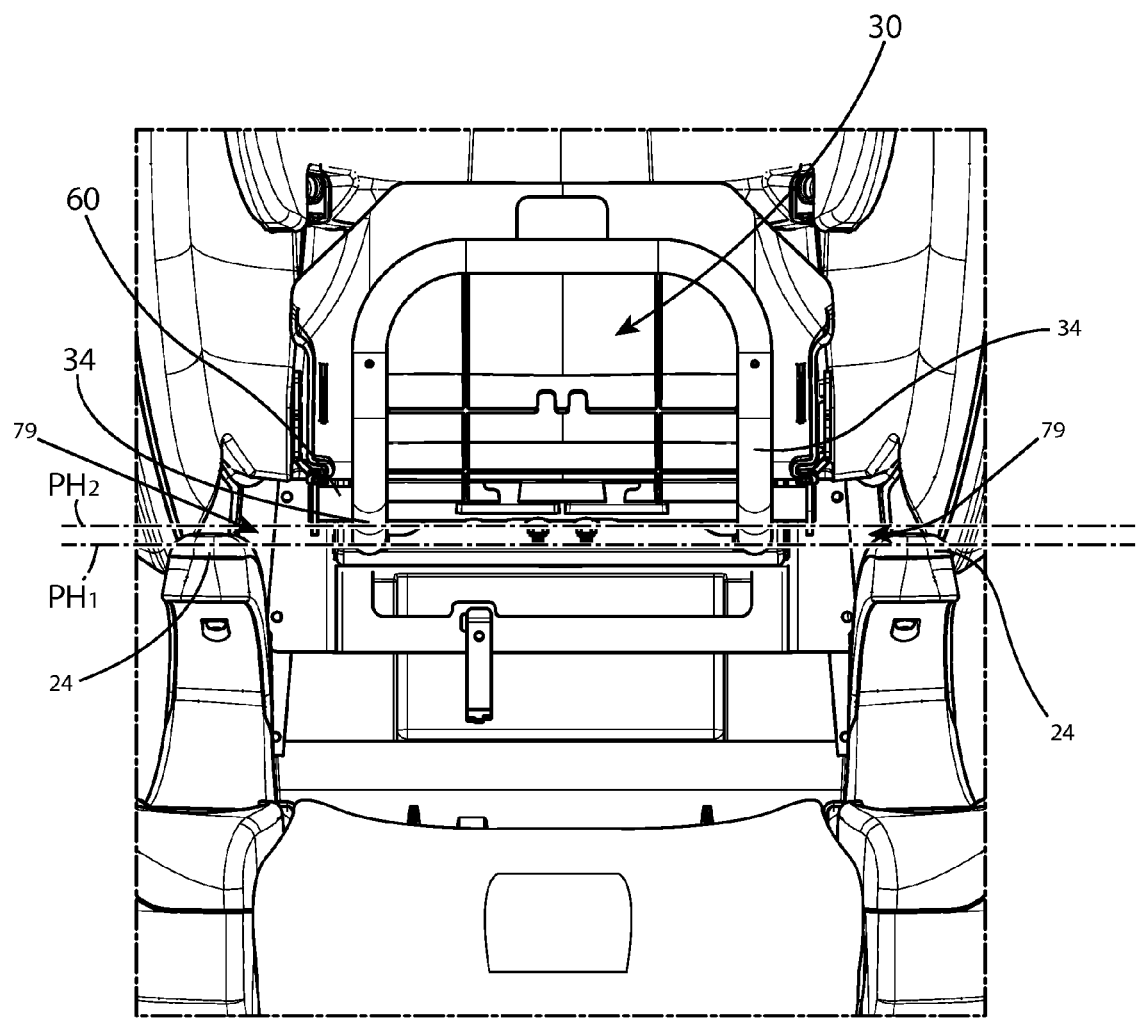
FIG. 3A shows a detailed view of the child seat and tensioning mechanism shown in FIG. 3, in accordance with an example embodiment of the present invention described herein.

Along these lines, in some embodiments, the child seat 10, and its components (e.g., tensioning mechanism 30, arm rests 22, 23, etc.) may define a belt path for easy positioning and engagement of the vehicle seat belt with the tensioning mechanism. In some embodiments, the belt path may comprise a belt guide channel that is configured to allow a user to easily position the vehicle seat belt for proper engagement with the tensioning mechanism. For example, in some embodiments, with reference to FIG. 3A, the seat base 12 may define a first arm rest 22 and a second arm rest 23. Each arm rest 22, 23 may define a top surface 24 that extends in a first horizontal plane $P_{H1}$. The tensioning mechanism 30 may define a bottom surface 34 that extends in a second horizontal plan $P_{H2}$ when the tensioning mechanism 30 is disposed in the second position. As shown in FIG. 3A, the second horizontal plane $P_{H2}$ may be configured to be above the first horizontal plane $P_{H1}$, such that the top surface 24 of each arm rest 22, 23 and the bottom surface 34 of the tensioning mechanism 30 define a belt guide channel 79 therebetween. The belt guide channel 79 may be configured to allow a user to easily position the vehicle seat belt between the top surface 24 of each arm rest 22, 23 and the bottom surface 34 of the tensioning mechanism 30, for example, by providing a space therebetween.

Additionally or alternatively, in some embodiments, other features may be used to define a belt path that allows for easy positioning and engagement of the vehicle seat belt with the tensioning mechanism. For example, in some embodiments, with reference to FIG. 1A, each arm rest 22, 23 may define a curved surface 108. The curved surface 108 may be configured to guide the vehicle seat belt into engagement with the tensioning mechanism 30 when the tensioning mechanism 30 is disposed in the second position (see e.g., the curved surface 108 shown in FIG. 7A).

While the depicted curved surface 108 and belt guide channels 79 provide a functional feature for guiding the portion of the vehicle seat belt into engagement with the tensioning mechanism, other curves, slopes, or adjustments may be made and are contemplated for embodiments of the present invention.

In some embodiments, the tensioning mechanism 30 may be configured to be locked in the first position (shown in FIGS. 1 and 2). Such a feature ensures that the tensioning mechanism 30 remains in the first position and prevents the full securement of the child seat 10 from being compromised. As such, in some embodiments, with reference to FIG. 3B, the tensioning mechanism 30 may comprise a locking mechanism 60. The structure and function of the locking mechanism 60 is illustrated in and described with respect to FIGS. 4, 4A, 4B, 5, and 5A. Though the locking mechanism 60 described herein has a specific structure and specific components, embodiments of the present invention contemplate use of other types of locking mechanisms with different structure.

Figure 3B:
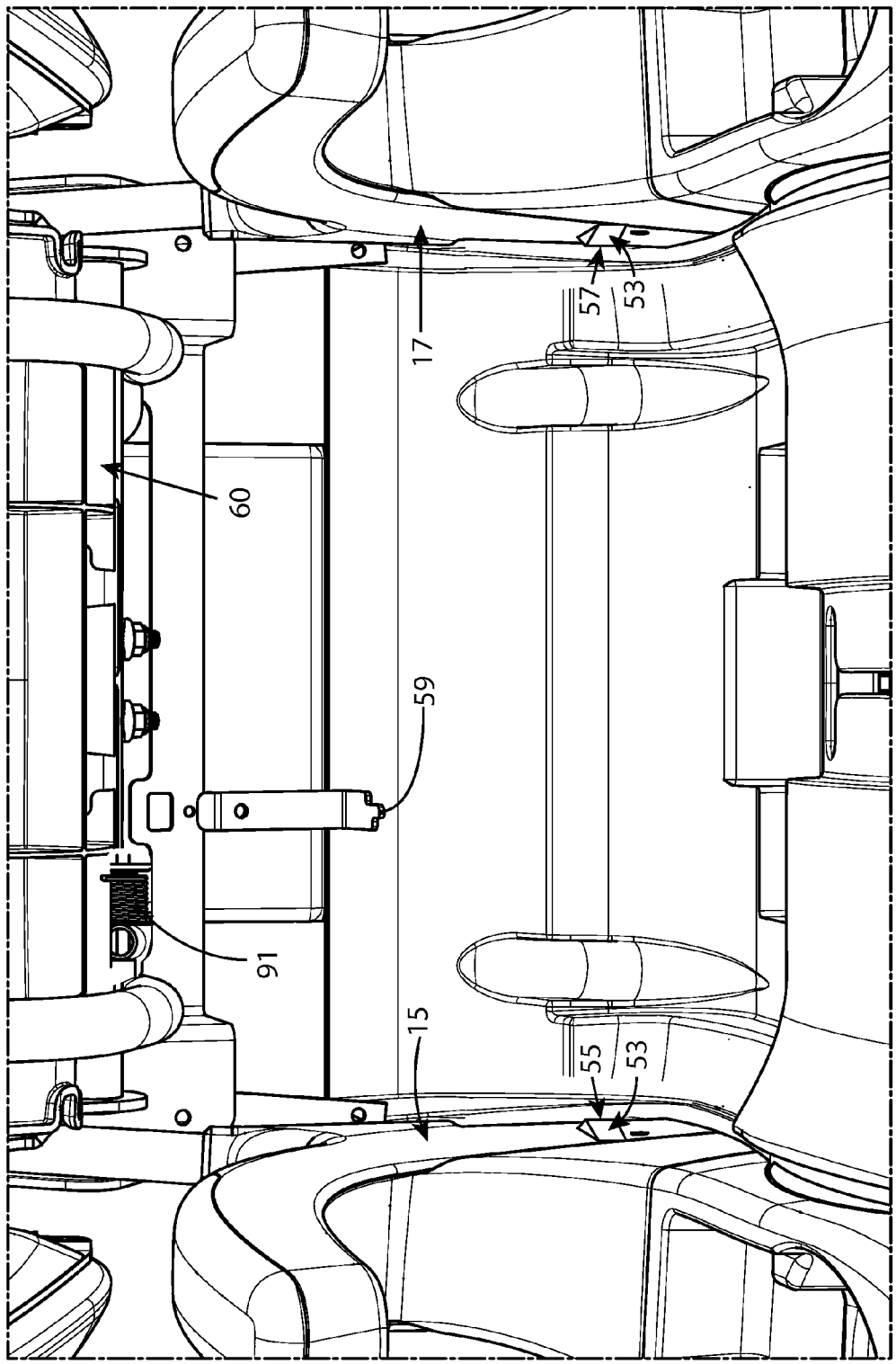
FIG. 3B shows a detailed perspective view of the child seat and tensioning mechanism shown in FIG. 3, in accordance with an example embodiment of the present invention described herein.

In some embodiments, the locking mechanism 60 may comprise two laterally-opposing locking members (e.g., bolts 61, 63) configured to translate between an extended position (FIG. 5A) and a retracted position (FIG. 5). As shown in FIG. 3B, the seat base 12 of the child seat 10 may define opposing side portions 15, 17. Additionally, each side portion 15, 17 may define a lock receiving portion 55, 57. Each lock receiving portion 55, 57 may be configured to receive a respective locking member 61, 63 when the tensioning mechanism 30 is in the first position and the locking members 62, 63 are in the extended position, thereby locking the tensioning mechanism 30 in the first position (shown in FIG. 2). In such a manner, the tensioning mechanism 30 will be locked and unable to be rotated out of the first position.

As shown in the depicted embodiment of FIG. 4, the locking mechanism 60 may comprise a cylindrical sleeve 66 that covers the components of the locking mechanism 60. The sleeve 66 may define openings that correspond to a first portion hole 62 and a second portion hole 64. Additionally, in some embodiments, the sleeve 66 may define a trigger opening 159 that, as will be described in greater detail herein, corresponds with a trigger 59 that is positioned on the seat base 12 (shown in FIG. 3B).

FIG. 4A illustrates the locking mechanism 60 with the sleeve 66 removed to show the components of the locking mechanism 60. In the depicted embodiment, the locking mechanism 60 comprises a first portion 72 and a second portion 74.

The first portion 72 may define a first portion hole 62 and a slot 83. Additionally, the first portion 72, in some embodiments, may be attached to a first locking member 61.

The second portion 74 may define a second portion hole 64 and a tab 92. The tab 92 may define a trigger member 95 and a retaining member 93. The tab 92 may be free at one end (e.g., a cantilever) such that it can bend in response to a force, such as may be applied to the trigger member 95 (e.g., a button). In such a manner, the tab 92, trigger member 95, and retaining member 93 may be configured to move between a trigger position (FIG. 5) and a withdrawn position (FIG. 5A). In some embodiments, whether due to the structure (e.g., material resistance) of the tab 92, or otherwise, the tab 92 may be biased to the trigger position. Additionally, the second portion 74, in some embodiments, may be attached to a second locking member 63.

The first portion 72 and second portion 74 may be configured to translate toward each other and away from each other along a longitudinal axis. In some embodiments, a portion of the first portion 72 may be configured to overlap a portion of the second portion 74 when in the retracted position. For example, with reference to FIG. 4B, the second portion 74 may be configured to translate under the first portion 72 such that the second portion hole 64, the tab 92, the trigger member 95, and the retaining member 93 are positioned within (e.g., behind) the slot 83 of the first portion 72 in the retracted position (as shown in FIG. 4A).

In some embodiments, the locking members 61, 63 may be biased toward the extended position. For example, with reference to FIG. 4A, a spring 76 may be positioned within the locking mechanism 60 to bias the first portion 72 and the second portion 74 apart such that the locking members 61, 63 are biased to extend outwardly.

In some embodiments, the retaining member 93 may be configured to retain the locking members 61, 63 in the retracted position, such as against the bias of the spring 76. For example, with reference to FIG. 5, the retaining member 93 may define a protrusion that is defined proximate the free end of the tab 92. The retaining member 93, in the retracted position, may be configured to engage a stop surface 77 of the slot 83 of the first portion 72. In such a manner, the engagement of the retaining member 93 and the stop surface 77 prevents the translation of the first portion 72 and the second portion 74 away from each other and, thus, prevents translation of the locking members 61, 63 to the extended position. However, as will be described in greater detail herein, when the trigger member 95 is depressed, the retaining member 93 releases from engagement with the stop surface 77, thereby allowing the bias of the spring 76 to force the first portion 72 and the second portion 74 apart such that the locking members 61, 63 translate to the extended position (shown in FIG. 5A).

In some embodiments, the locking members 61, 63 of the locking mechanism 60 may be configured to automatically translate to the extended position when the tensioning mechanism 30 is rotated from the second position to the first position. Additionally, in some embodiments, the trigger member 95 may be configured to interact with the backrest portion 16 of the seat base 12 when the tensioning mechanism 30 is rotated to the first position to move the trigger member 95 from the trigger position (FIG. 5) to the withdrawn position (FIG. 5A). Additionally, in some embodiments, the trigger member 95 may be configured to cause the retaining member 93 to release the locking members 61, 63 in the withdrawn position.

For example, with reference to FIG. 3B, the backrest portion 16 of the seat base 12 may comprise a trigger 59 that protrudes outwardly from the seat base 12 toward the locking mechanism 60 when the locking mechanism 60 and tensioning mechanism 30 are disposed in the first position of FIG. 1. When the tensioning mechanism 30 and the locking mechanism 60 are rotated into the first position, the trigger 59 may be configured to protrude through the trigger opening 159 (shown in FIG. 4) in the sleeve 66 of the locking mechanism 60 and engage the trigger member 95 (FIG. 5) to release the retaining member 93 from engagement with the stop surface 77. With reference to FIG. 5, depression of the trigger member 95 causes the tab 92 to bend and, thus, release the retaining member 93 from engagement with the stop surface 77. In such a manner, the trigger member 95 moves from the trigger position (FIG. 5) to the withdrawn position (FIG. 5A). In the withdrawn position, the retaining member 93 and trigger member 95 may slide underneath the stop surface 77 as the first portion 72 and the second portion 74 translate away from each other (e.g., in the direction of arrows $B_1$ and $B_2$, respectively) due to the bias of the spring 76. This also causes the first locking member 61 and the second locking member 63 to translate (e.g., in the direction of arrows $B_1$ and $B_2$, respectively) from the retracted position (FIG. 5) to the extended position (FIG. 5A). With reference to FIG. 3B, the position of the trigger 59 may cause the locking members 61, 63 to be positioned proximate the locking receiving portions 55, 57 when release of the locking members 61, 63 occurs, thereby causing the locking members 61, 63 to engage their respective lock receiving portions 55, 57. As such, the tensioning mechanism 30 may become automatically locked with the seat base 12 when rotated into the first position.

As noted above, with reference to FIG. 2, the tensioning mechanism 30 may comprise a latch 80 with two pockets 82, 84 that are configured to each receive a finger of a user. The two pockets may be configured to translate toward each other to cause the locking members to move from the extended position to the retracted position, enabling a user to unlock the tensioning mechanism. The first pocket 82 may be connected to the first portion 72 of the locking mechanism 60, such as through the first portion hole 62 (e.g., an extension of the first pocket 82 may engage the first portion hole 62). The second pocket 84 may be connected to the second portion 74 of the locking mechanism 60, such as through the second portion hole 64 (e.g., an extension of the second pocket 84 may engage the second portion hole 64). Each pocket 82, 84 may receive a finger of a user (not shown). The user may translate the pockets 82, 84 toward each other (e.g., in the direction of arrow E). Due to the connection of each pocket 82, 84 to a respective first and second portion 72, 74, movement of the pockets 82, 84 toward each other causes movement of the first portion 72 and second portion 74 toward each other. Thus, a user may provide a translation force against the bias of the spring 76 to cause the first portion 72 and second portion 74 to translate toward each other (e.g., in the direction of arrow E), thereby causing the locking members 61, 63 to translate from the extended position (FIG. 5A) to the retracted position (FIG. 5).

Additionally, in some embodiments, translation of the first portion 72 and second portion 74 toward each other may cause the tab 92 and the retaining member 93 to translate to a position below the slot 83. In this way, the bias of the tab 92 may cause the tab 92 to return to the trigger position (FIG. 5), which causes the retaining member 93 to move to the trigger position and engage the stop surface 77 of the first portion 72. With the retaining member 93 engaged with the stop surface 77, the locking members 61, 63 are retained in the retracted position.

In some circumstances, even despite the bias of the tab 92 and retaining member 93 to retain the locking members 61, 63 in the retracted position, the locking members 61, 63 may be released (accidentally or otherwise) while the tensioning mechanism 30 is out of the first position. In such a situation, with the locking members 61, 63 in the extended position, it may be difficult to rotate the tensioning mechanism 30 into the first position due to the interference of the extended locking members 61, 63 with the respective lock receiving portions 55, 57 of the seat base 12. As such, in some embodiments, with reference to FIG. 3B, the seat base 12 may define a ramp 53 proximate each lock receiving portion 55, 57. The ramp 53 may be configured to enable the tensioning mechanism 30 to rotate from the second position to the first position when the locking members 61, 63 are in the extended position. For example, each ramp 53 may define a tapered surface that, when engaged by a locking member, causes each locking member 61, 63 to translate toward the retracted position until the tensioning mechanism 30 is able to rotate into the first position and then the each locking member 61, 63 may be able to translate to the extended position to engage with a respective lock receiving portion 55, 57.

As noted above, some example embodiments of the present invention provide a tensioning mechanism for a child seat that is configured to enable easy and full securing of the child seat to a vehicle seat with a vehicle seat belt (e.g., the child seat is easily secured in a tensioned configuration by the user).

As used herein, in some embodiments, the vehicle seat belt may be also referred to as a belt or seat belt. Additionally, in some embodiments, reference to a vehicle seat belt, seat belt, or belt may include both a lap section and a shoulder section of the belt of the vehicle seat or either of the two individually. Moreover, while the depicted embodiments detail the use of both a lap section and a shoulder section of the belt of a vehicle seat, other embodiments may only use a lap section or a shoulder section for securement of the child seat. Along these same lines, while the depicted embodiments are described with respect to a car seat, other vehicles or surfaces using belts for securement are contemplated. Indeed, the present invention is not meant to be limited to cars.

In such a regard, in some embodiments, the seat base of the child seat may be configured to receive an untensioned belt of a vehicle seat to secure the child seat in an untensioned configuration. For example, with reference to FIG. 6, the seat base 12 of the child seat 10 may be configured to receive an untensioned belt 25 of a vehicle seat 28, such as to be engaged with the tensioning mechanism 30, when the tensioning mechanism 30 is disposed in the second position.

As noted above, in some embodiments, the belt 25 may define a lap section 27 and a shoulder section 29. The lap section 27 may define a portion of the belt 25 that extends from a lower anchor on a vehicle (not shown) to a buckle 221 (shown in FIG. 6A) such that it defines the portion of the belt 25 that would pass over the lap of a vehicle seat occupant. The shoulder section 29 may define a portion of the belt 25 that extends from an upper anchor on a vehicle (not shown) to the buckle 221 (shown in FIG. 6A) such that it defines the portion of the belt 25 that would pass across a shoulder of a vehicle seat occupant.

In some embodiments, in the second position, the tensioning mechanism 30 may be configured to receive a portion of the belt 25. Additionally, in the depicted embodiment of FIG. 6A, the tensioning mechanism 30 is configured to receive a portion of the lap section 27 of the belt 25 and a portion of the shoulder section 29 of the belt. As noted above, the portion of the belt 25 may be received along a belt path, such as within the belt guide channel 79. Once the portion of the belt 25, such as the portion of the lap section 27 and the portion of the shoulder section 29, have been received by the tensioning mechanism 30, the buckle 221 of the belt 25 may be engaged with a buckle 21 of the vehicle seat 28. In such a manner, the untensioned belt 25 of the vehicle seat 28 has secured the child seat 10 in an untensioned configuration. For example, in some embodiments, slack may remain in the belt 25 such that the child seat 10 is not fully secured to the vehicle seat 28.

A further example of the child seat 10 not being fully secured to the vehicle seat 28 is illustrated in FIG. 7A. While the belt 25 has been received by the tensioning mechanism 30 and latched with the buckle 21 of the vehicle seat 28, a space 112 may remain between the backrest portion 16 of the seat base 12 and the backrest portion 113 of the vehicle seat 28. Such space 112 may be detrimental to the safety of an occupant of the child seat 10 and may lead to harm during a sudden deceleration, such as during a vehicle impact.

In some embodiments, once the belt 25 is engaged with the tensioning mechanism 30, the tensioning mechanism 30 may be rotated into the first position to apply tension to a portion of the belt 25 to secure the child seat to the vehicle seat in a tensioned configuration. For example, with reference to FIG. 7, the tensioning mechanism 30 may be rotated (e.g., in the direction of arrow C) to apply tension to the portion of the lap section 25 and the portion of the shoulder section 29 of the belt 25 engaged with the tensioning mechanism 30. With reference to FIG. 8, once the tensioning mechanism 30 (shown in FIG. 7) is rotated into the first position, the tension applied to the portion of the belt 25 causes the child seat 10 to secure to the vehicle seat 28 in a tensioned configuration.

In some embodiments, the tensioning mechanism 30 may be configured to rotate, in response to receiving a substantially vertical force, from the second position to the first position to apply tension to the portion of the belt 25. In such an embodiment, a user may simply push substantially straight down to effectuate fully secure installation of the child seat to a vehicle seat (e.g., the user may push down to install the child seat in a tensioned configuration). For example, with reference to FIG. 7A, a user 230 may provide a substantially vertical force (e.g., in the direction of arrow F) to the tensioning mechanism 30, such as with their hand 231. The substantially vertical force may cause the tensioning mechanism 30 to rotate from the second position (FIG. 7A) to the first position (FIG. 8A).

In some embodiments, with reference to FIG. 8A, due to the applied tension on the portion of the belt 25 from the tensioning mechanism 30, the child seat 10 may be pulled tightly (e.g., in the direction of arrow D) to the backrest portion 113 of the vehicle seat 28. In contrast, with reference to FIG. 7A, before rotation of the tensioning mechanism 30, a space 112 may exist between the backrest portion 16 of the seat base 12 and the backrest portion 113 of the vehicle seat 28.

In some embodiments, the tension applied to the portion of the belt 25 may be the result of displacement of the portion of the belt 25 that is engaged with the tensioning mechanism 30. Such displacement may cause an increased tension in the belt 25, which may cause the child seat 10 to more fully secure to the vehicle seat 28 (e.g., the tensioned configuration shown in FIG. 8A). For example, with reference to FIG. 6A, the portion of the lap section 27 and the shoulder section 29 of the belt 25 may extend substantially in a horizontal plane ($H_{P3}$) from the first arm rest 22 to the second arm rest 23. However, once the tensioning mechanism 30 has been rotated into the first position (e.g., in the direction of arrow C as illustrated in FIG. 7A), the portion of the lap section 27 and the portion of the shoulder section 29 of the belt 25 may be displaced by the bottom surface 34 of the tensioning mechanism 30 (e.g., out of the horizontal plane ($H_{P3}$) (shown in FIG. 6A)) such that the portion of the lap section 27 and the shoulder section 29 of the belt 25 are substantially adjacent to the backrest portion 16 of the seat base 12. In such a manner, the distance between the horizontal plane ($H_{P3}$) and the new plane of the portion of the lap section 27 and the shoulder section 29 (e.g., substantially adjacent to the bottom surface 34 of the tensioning mechanism 30 and the backrest portion 16 of the seat base 12) may define the distance of displacement of the portion of the belt 25.

In some embodiments, with reference to FIG. 8A, the portion of the belt 25 may be displaced from a position proximate a surface of the arm rest. For example, in the depicted embodiment of FIG. 8A, the distance of displacement of the portion of the belt 25 is the distance between the angled surface 110 of the arm rest 22, 23 and the bottom surface 34 of the tensioning mechanism 30 (not shown) when the tensioning mechanism 30 is disposed in the first position.

In some embodiments, the angled surface 110 may be configured to adjacently engage and align the portion of the belt 25 when the child seat 10 is in the tensioned configuration. For example, in the depicted embodiment of FIG. 7A, the portion of the belt 25 may fit on the angled surface 110, which may cause the portion of the belt 25 to be properly aligned during rotation of the tensioning mechanism 30 from the second position (FIG. 7A) to the first position (FIG. 8A) such that the portion of the belt 25 is properly received within the child seat 10 when the child seat 10 is in the tensioned configuration.

While the depicted angled surface 110 provides a functional feature of alignment of the belt of the vehicle seat, other angles or adjustments may be made and are contemplated for embodiments of the present invention.

Some embodiments of the child seat 10 provide a seat base 12 that includes an open belt path. An open belt path is one in which the seat belt 25 may be engaged with the child seat 10 without having to be threaded through or overlap with any components of the child seat 10. One example of an open belt path is one in which the seat base 12 is capable of receiving an edge of the belt 25 when the tensioning mechanism 30 is in the second position, so as to allow the belt 25 to be received by the tensioning mechanism 30 even while the belt 25 is buckled to the vehicle seat 28 or while a user is holding the buckle engaging portion of the belt 25. In this example, the open belt path is defined by the belt 25 being able to engage the child seat without the need to thread the belt through an orifice or hole formed in the seat base 12.

In an embodiment of the present invention, the open belt path is created by the displacement of the tensioning mechanism 30. The tensioning mechanism 30 may move to the second position, out of the way of the belt path so that the seat belt 25 may be laid across the child seat 10 in an untensioned configuration. After the seat belt 25 is across the child seat and engaged with the buckle 21 on the vehicle seat 28, the tensioning mechanism 30 may be returned to the first position to tension the seat belt 25.

In other embodiments, shown in FIGS. 9-15, child seats 300 are provided that include open belt paths 335, 340 configured to accommodate installation in either a front-facing (FIG. 9) or rear-facing (FIG. 10) orientation. For example the child seat 300 may be convertible between the front-facing and rear-facing orientations such that a user may choose whichever orientation best suits the needs of the child. Embodiments of the present invention may also be used in solely front-facing, solely rear-facing, or both orientations.

With reference to FIGS. 9-11, the child seat 300 may include a seat base 305, which includes a seat portion 310 and a backrest portion 315. In some embodiments, the seat base 305 may further define a first edge 320 and a second edge 325 along the sides of the seat portion 310 and may be connected to the backrest portion 315. The seat base 305 may be configured to receive the belt 317 so as to define a first belt path 340 spanning the first 320 and second 325 edges. In some embodiments, the seat base 305 may be configured to receive the belt 317 so as to define a second belt path 335 spanning the first 320 and second 325 edges. As will be described in greater detail below, the edges 320, 325 may be configured to support and contain an occupant of the child seat 300 as well as supporting the belt paths 335, 340 spanning the first 320 and second 325 edges and various inlet channels 345, 350 and receiving channels 355, 360.

The seat base 305 may be configured to receive a seat belt 317 in an untensioned state. Because embodiments of the child seat 300 have a tensioning mechanism 330, there is no need for the belt 317 to be tensioned directly by a user grasping the belt 317. Rather the user may apply tension to the belt 317 by rotating the tensioning mechanism 330 between a second position (shown in FIG. 12) and a first position (shown in FIG. 11), where the first position is substantially adjacent to the seat base 305 and the second position is displaced therefrom. The movement of the tensioning mechanism 330 to the first position may cause the tensioning mechanism 330 to contact a portion of the belt 317 and apply tension to the belt 317. In some embodiments, the portion of the tensioning mechanism 330 that contacts the belt 317 and holds the belt 317 against the seat base 305 may be defined as an engaging surface. The engaging surface of the tensioning mechanism 330 may be used to apply tension to the belt 317 by moving the tensioning mechanism 330 from the second position to the first position so that the engaging surface of the tensioning mechanism 330 is adjacent a surface of the seat base 305. As described above and as shown in FIGS. 9-10, the tensioning mechanism 330 pushes down on the portion of the belt 317 to create tension when it moves into the first position. Placing the tensioning mechanism 330 in the second position may therefore remove the tension (e.g. allowing the belt to be unbuckled and the child seat to be unsecured from the vehicle seat) or allow an unsecured seat base 305 to receive the belt 317. In some embodiments and with reference to FIG. 12, the second position may be pivotally disposed from the backrest 315 of the seat base 305. For example, the tensioning mechanism 330 may be rotated about a pair of hinges 365 so that the tensioning mechanism 330 rises out of the way of the belt paths 335, 340 (shown in FIG. 14).

In addition to receiving the belt 317 in an untensioned state, and as described above, the displacement of the tensioning mechanism 330 away from the belt paths 335, 340 allows the seat base 305 to have open belt paths 335, 340. Open belt paths 335, 340, as discussed above, allow the belt 317 to be engaged with the seat base 305 without interference by the various portions of the child seat 300. In some embodiments, an open belt path 335, 340 may be defined by the seat base 305 being configured to receive an edge of the belt 317 when the tensioning mechanism 330 is in the second position while the belt 317 is in a buckled position with the vehicle seat 302.

In some embodiments, the tensioning mechanism 330 may be configured to rotate, in response to receiving a substantially vertical force, from the second position to the first position to apply tension to the portion of the belt 317. In such an embodiment, a user may simply push substantially straight down to effectuate fully secure installation of the child seat 300 to a vehicle seat 302 (e.g., the user may push down to install the child seat 300 in a tensioned configuration). For example, with reference to FIG. 12, a user may provide a substantially vertical force to the tensioning mechanism 330, such as with their hand (shown also in FIG. 7A). The substantially vertical force may cause the tensioning mechanism 330 to rotate from the second position (FIG. 12) to the first position (FIG. 11).

The present invention envisions numerous configurations of belt paths 335, 340 and various mechanisms and structures for holding the belt 317 within the belt paths 335, 340. For example the belt paths 335, 340 may be designed and configured to place the belt 317 in a position to exert a securing force on the child seat 300 for each respective orientation and hold the child seat 300 securely on the vehicle seat 302. With reference to FIG. 14, some embodiments of the seat base 305 use a first belt path 340 and a second belt path 335. The two belt paths 335, 340 may correspond to the front- and rear-facing orientations of the child seat 300 shown in FIG. 9 and FIG. 10, respectively.

FIG. 9 shows a child seat 300 of one embodiment of the present invention configured in a front-facing direction and attached to a vehicle seat 302 by a seat belt 317. The seat belt 317 may be engaged with the child seat 300 via the second belt path 335 that spans a distance between the two edges 320, 325 of the seat base 305 and is disposed between the tensioning mechanism 330 and the seat base 305. In one embodiment, the second belt path 335 is defined proximate the intersection of the backrest portion 315 and the seat portion 310 of the seat base 305, as shown in FIG. 9.

FIG. 10 shows a child seat 300 of one embodiment of the present invention configured in a rear-facing orientation and attached to a vehicle seat 302 by a seat belt 317. The seat belt 317 may be engaged with the child seat 300 via the first belt path 340 that spans a distance between the two edges 320, 325 of the seat base 305 and is disposed between the tensioning mechanism 330 and the seat base 305. The first belt path 340 may be defined approximately across the seat portion 310 of the seat base 305, such that the first belt path 340 lies proximate an intermediate region of the seat portion 310. The intermediate region of the seat portion, shown where the first belt path 340 crosses the seat portion 310 in FIG. 14, may be located in between a front edge of the seat portion 310 and proximate an intersection of the backrest portion 315 and the seat portion 310, as depicted.

With reference to FIGS. 13-14, as described in greater detail below, the belt path 335, 340 and belt guide channel 335, 340 (see also 79) may be defined by retaining channels 355, 360. The retaining channels 355, 360 may be configured to maintain the seat belt 317 in a preferred position for securing the child seat 300. In some embodiments, the retaining channels 355, 360 are defined as slots in the edges 320, 325 of the seat base 305, such that the belt path 335, 340 spans the child seat 300 between the two edges 320, 325. There may be a number of retaining channels 355, 360 in different locations depending on the amount and angle α of the force required to secure the child seat 300.

An inlet channel 345, 350 may be provided to allow the respective retaining channels 355, 360 to be accessed. In some embodiments, the inlet channels 345, 350 may be configured to guide a portion of the belt 317 into a respective retaining channel 355, 360. Each inlet channel 345, 350 may, for example, connect the surface of the edges 320, 325 to the retaining channel 355, 360. With respect to FIGS. 9-10 and 14, there may be multiple belt paths 335, 340 that define multiple sets of retaining channels 355, 360 with multiple inlet channels 345, 350 for each of the front- and rear-facing orientations of the same child seat 300. For example, FIGS. 9-10 depict an embodiment of the present invention whereby the child seat 300 is configured with two belt paths 335, 340 and two sets of retaining channels 355, 360 and inlet channels 345, 350, such that the child seat 300 may be held selectively in either orientation (front- or rear-facing) by the corresponding set of retaining channels 355, 360. With reference to FIG. 10, the rear-facing child seat 300 may be secured by a belt 317 that is maintained in the first belt path 340 defined by retaining channels 355, which are accessed by inlet channels 345. Likewise, with reference to FIG. 9, the front-facing child seat 300 may be secured by the belt 317 that is engaged in the second belt path 335 defined by retaining channels 360, which are accessed by inlet channels 350.

Embodiments of the present invention contemplate various configurations of belt paths and channels and should not be construed to limit the child seat 300 to two belt paths 335, 340 and two orientations. For example, the seat base 305 may comprise a single belt path with a single set of retaining channels configured to accommodate both orientations of the child seat 300. Alternatively, the seat base 305 may comprise multiple belt paths disposed on different sides of one large retaining channel with a single inlet channel for both belt paths. Further, there may be multiple belt paths and/or channels for each possible orientation to allow for fine tuning of the position of the child seat 300.

In an exemplary embodiment, the belt paths 335, 340 and child seat 300 may be configured so that the force for moving the tensioning mechanism 330 from the second position to the first position while the belt 317 is in the first belt path 340 corresponding to the rear-facing orientation is substantially similar to a force for moving the tensioning mechanism 330 from the second position to the first position while the belt 317 is in the second belt path 335 corresponding to the front-facing orientation. For example, the force needed to secure the tensioning mechanism 330 in the first position may be determined as a function of the final tension in the belt 317 and the length of a lever arm created by moving the end of the tensioning mechanism 330 about a pivot point (e.g. the hinges 365). Configuring the tensioning mechanism 330 to receive the same force to be secured in the first position in both the front- and rear-facing orientations would ensure similar operability in each of the two orientations because each would require a similar force input to engage the tensioning mechanism 300 with the portion of the belt 317. The belt paths 335, 340 and child seat 300 may be further configured so that the resulting tension applied to the belt 317 by the tensioning mechanism 330 when the belt 317 is in the first belt path 340 is substantially similar to the resulting tension applied to the belt 317 by the tensioning mechanism 330 when the belt 317 is in the second belt path 335. For example, in some cases, the tensioning mechanism 330 may be configured to apply a tension of approximately 20 to approximately 60 pounds. Having similar tensions in both orientations may help to ensure that the child seat 300 is securely attached to the vehicle seat 302 in either orientation. Moreover, the user may be better able to know when the child seat 300 is secured if both the force of pushing the tensioning mechanism 300 to the first position and the resulting tension in the belt 317 are the same in both the front- and rear-facing orientations.

As described above, with reference to FIG. 14, the first belt path 340 may be defined as an approximately linear path across the seat portion 310 of the seat base 305 such that the first belt path 340 lies proximate an intermediate region of the seat portion 310, and the second belt path 335 may be defined as an approximately linear path proximate the intersection of the backrest portion 315 and the seat portion 310 of the seat base 305. The positions of the belt paths 335, 340 may be more specifically adjusted to modify the tension applied to the belt 317 and the force required to push the tensioning mechanism 330 into the first position as described above. For example, one way to adjust the tension may be to change the angle α of an outer part of the belt 317 extending between the edge 320, 325 of the child seat 300 and the vehicle seat 302 to control the angle α that the outer part of the belt 317 is pulling on the child seat 300. For example, in a rear-facing orientation such as FIG. 10, the first belt path 340 may be moved towards the backrest portion 315 to make the outer part of the belt 317, and thus the tension, more horizontal (e.g. decrease the angle α), or vice versa, the first belt path 340 may be moved away from the backrest portion 315 to make the outer part of belt 317, and thus the tension, more vertical (e.g. increase the angle α). Likewise, in a front-facing orientation such as FIG. 9, the second belt path 335 may be moved away from the backrest portion 315 to make the outer part of the belt 317, and thus the tension, more horizontal, or vice versa, the second belt path 335 may be moved up along the backrest portion 315 to make the outer part of the belt 317, and thus the tension, more vertical.

Additionally, with reference to FIGS. 12-13, the height h1, h2 of the belt paths 335, 340 and retaining channels 355, 360 may be adjusted to increase or decrease the tension on the belt 317. As described above, the tension on the belt 317 is created by the deflection of the belt path 335, 340, and thus the portion of the belt 317, by the tensioning mechanism 330. The farther the portion of the belt 317 is deflected, the greater the resulting tension on the belt 317. In some embodiments, the tensioning mechanism 330 may be configured to deflect the portion of the belt 317 from its untensioned configuration until it is adjacent to the seat base 305, as shown in FIGS. 9-10. The distance that the belt 317 is deflected may then be determined by how high h1, h2 above the seat base 305 the belt 317 is positioned in its untensioned configuration. The position of the belt 317 and belt path 335, 340 in the untensioned configuration may, in turn, be controlled by the position of the retaining channels 355, 360 along the edges 320, 325 with respect to the seat base 305. Thus in some configurations, the farther away from the seat base 305 the retaining channels 355, 360 are disposed along the edges, the more tension is applied to the belt 317.

As discussed above and in some embodiments, the tensioning mechanism 330 may comprise an engaging surface that is adjacent to a surface of the seat base 305 when the tension mechanism 330 is in the first position, and wherein a portion of the first belt path 340 corresponding to the first 320 and second 325 edges is positioned higher than a portion of the first belt path 340 corresponding to the engaging surface of the tensioning mechanism 330 such that a portion of the belt 317 engaged by the engaging surface is deflected substantially towards the seat base 305 with respect to portions of the belt 317 engaged by the first 320 and second 325 edges when the tensioning mechanism 330 is in the first position. The possible positions and angles α discussed above are not meant to limit the invention but rather are exemplary of how the location of the belt paths 335, 340 may be varied to apply a desired tension to the belt 317 and adjust the force required by the user to achieve the desired tension.

Some example embodiments of the present invention contemplate a method of manufacturing a child seat comprising any components or any embodiments described herein. For example, in some embodiments, a method of manufacturing a child seat configured to be secured to a vehicle seat may comprise providing a seat base as described herein and attaching a tensioning mechanism as described herein to the seat base. The seat base and tensioning mechanism may be configured at least as described herein with respect to any embodiments or combination of embodiments.

Some embodiments of a method for manufacturing a child seat 300 configured to be secured to a vehicle seat 302 in both a rear-facing orientation and a front-facing orientation may include providing a seat base 305 defining a seat portion 310 and a backrest portion 315. The seat base 305 may be configured to receive a belt 317 of the vehicle seat 302 in an untensioned state to secure the child seat 300 to the vehicle seat 302 in an untensioned configuration. Some embodiments of the method may include attaching a tensioning mechanism 330 to the seat base. The tensioning mechanism 330 may be rotatable between a first position substantially adjacent to the seat base 305 and a second position displaced therefrom, wherein placing the tensioning mechanism 330 in the second position may allow the seat base 305 to receive the belt 317, and the movement of the tensioning mechanism 330 from the second position to the first position may apply tension to the belt 317 to secure the child seat 300 to the vehicle seat 302 in a tensioned configuration. In some embodiments of the present invention, the seat base 305 of the child seat 300 may be configured to receive the belt 317 in both a rear-facing and front-facing orientation. The method for manufacturing a child seat may also include a seat base 305 defining a first edge 320 and a second edge 325, wherein the seat base 305 is configured to receive the belt 317 so as to define a first belt path 340 spanning the first 320 and second 325 edges. In some embodiments, the first 320 and second 325 edges may include an inlet channel 345, 350 and a retaining channel 355, 360, wherein each inlet channel 345, 350 may be configured to guide a portion of the belt 317 into the respective retaining channel 355, 360.

Along these same lines, some example embodiments of the present invention contemplate any combination of embodiments or components described herein. Although some features of the respective embodiments are not shown in all of the figures for purposes of explanation and to allow clearer viewing of the components of the child seat 300, such features may nonetheless be incorporated into any embodiment. For example, the embodiments of the child seat 300 shown in FIGS. 9-15 may also comprise a harness (e.g. shown in FIG. 1) defining a first harness portion and a second harness portion configured to rotate with the tensioning mechanism 330 between the first position and the second position such that the harness is displaced away from the first belt path 340 when the tensioning mechanism 330 is moved from the first position to the second position. Additionally, the embodiments of the child seat 300 shown in FIGS. 9-15 may also comprise padding, cushions, or other features (e.g. shown in FIG. 1) to provide comfort and/or additional safety for an occupant. Some embodiments of the belt 317 shown in FIGS. 9-15 may define a lap section and a shoulder section (e.g. shown in FIG. 8), where the seat base 305 is configured to receive a portion of the lap section and a portion of the shoulder section of the belt 317 in an untensioned state to secure the child seat 300 to the vehicle seat 302 in an untensioned configuration.

In some embodiments of the child seat 300 shown in FIGS. 9-15, the seat base 305 may further defines opposing side portions, wherein each side portion comprises a lock receiving portion, wherein the tensioning mechanism 330 further comprises a locking mechanism comprising two laterally-opposing locking members configured to translate between an extended position and a retracted position. As described in greater detail above in connection with the embodiments depicted in FIGS. 2-5A, each lock receiving portion may be configured to receive a respective locking member when the tensioning mechanism 330 is in the first position and the locking members are in the extended position, thereby locking the tensioning mechanism 330 in the first position, and wherein the locking members are configured to automatically translate to the extended position when the tensioning mechanism 330 is rotated from the second position to the first position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed. Although specific terms are employed herein, they are used in a generic and descriptive sense only and not for purposes of limitation.

What is claimed is:

1. A child seat configured to be secured to a vehicle seat in both a rear-facing and front-facing orientation, the child seat comprising:

a seat base defining a seat portion, a backrest portion, and first and second lateral edges that protrude forwardly and upwardly from the seat and backrest portions, wherein the seat base is configured to receive a belt of the vehicle seat in an untensioned state to secure the child seat to the vehicle seat in an untensioned configuration; and a tensioning mechanism having a proximal end pivotally attached to the backrest portion of the seat base and a distal end comprising a sitting surface for an occupant of the child seat and an engaging surface facing opposite to the sitting surface, wherein the tensioning mechanism is movable downwardly and forwardly to a first position substantially adjacent to the seat base and upwardly and rearwardly to a second position displaced therefrom, wherein placing the tensioning mechanism in the second position allows the seat base to receive the belt, and movement of the tensioning mechanism from the second position to the first position presses the belt against the first and second edges and deflects a portion of the belt between first and second edges to be closer to the seat or backrest portion than portions of the belt that engage the first and second edges and thus applies tension to the belt to secure the child seat to the vehicle seat in a tensioned configuration, wherein the seat base of the child seat is configured to receive the belt when the seat base is in both a rear-facing orientation and when the seat base is in a front-facing orientation.

2. The child seat according to claim 1, wherein the tensioning mechanism is configured to rotate, in response to receiving a substantially vertical force, from the second position to the first position to apply tension to the belt to secure the child seat to the vehicle seat in a tensioned configuration.

3. The child seat according to claim 1, wherein the seat base is configured to receive the belt so as to define a first belt path spanning the first and second edges.

4. The child seat according to claim 3, wherein each of the first and second edges further comprises an inlet channel and a retaining channel, wherein each inlet channel is configured to guide the portions of the belt that engage the first and second edges into the respective retaining channel.

5. The child seat according to claim 3, wherein the seat base is further configured to receive the belt so as to define the first belt path when the child seat is in the rear-facing orientation, and wherein the seat base is configured to receive the belt so as to define a second belt path spanning the first and second edges when the child seat is in the forward-facing orientation.

6. The child seat according to claim 5, wherein the first belt path is defined between the tensioning mechanism and the seat base at a position proximate an intermediate region of the seat portion.

7. The child seat according to claim 5, wherein the second belt path is defined between the tensioning mechanism and the seat base at a position proximate an intersection of the backrest portion and the seat portion.

8. The child seat according to claim 5, wherein a force for moving the tensioning mechanism from the second position to the first position while the belt is in the first belt path is substantially the same as a force for moving the tensioning mechanism from the second position to the first position while the belt is in the second belt path; and wherein the resulting tension applied to the belt in the first belt path is substantially the same as the resulting tension applied to the belt in the second belt path.

9. The child seat according to claim 3, wherein the seat base provides an open belt path, such that the seat base is configured to receive an edge of the belt when the tensioning mechanism is in the second position while the belt is in a buckled position with the vehicle seat.

10. The child seat according to claim 1, wherein the seat base further defines opposing side portions, wherein each side portion comprises a lock receiving portion, wherein the tensioning mechanism further comprises:

a locking mechanism comprising two laterally-opposing locking members configured to translate between an extended position and a retracted position, wherein each lock receiving portion is configured to receive a respective locking member when the tensioning mechanism is in the first position and the locking members are in the extended position, thereby locking the tensioning mechanism in the first position, and wherein the locking members are configured to automatically translate to the extended position when the tensioning mechanism is rotated from the second position to the first position.

11. A child seat configured to be secured to a vehicle seat, the child seat comprising:

a seat base defining a seat portion and a backrest portion, wherein the seat base is configured to receive a belt of the vehicle seat in an untensioned state to secure the child seat to the vehicle seat in an untensioned configuration, wherein the seat base further defines a first edge and a second edge that protrude forwardly and upwardly from the seat and backrest portions, wherein the seat base is configured to receive the portion of the lap section and the portion of the shoulder section of the belt so as to define a belt path spanning the first and second edges, wherein each of the first and second edges further comprise an inlet channel and a retaining channel such that the belt path extends from the retaining channel in the first edge to the retaining channel in the second edge, wherein the inlet channels of the first and second edge guide the belt into the retaining channels; and a tensioning mechanism having a proximal end pivotally attached to the backrest portion of the backrest portion of the seat base and a distal end comprising a sitting surface for an occupant of the child seat and an engaging surface facing opposite to the sitting surface, wherein the tensioning mechanism is rotatable downwardly and forwardly to a first position substantially adjacent to the seat base and upwardly and rearwardly to a second position displaced therefrom, wherein placing the tensioning mechanism in the second position allows the seat base to receive the belt, and the movement of the tensioning mechanism from the second position to the first position presses the belt against the first and second edges and deflects a portion of the belt between first and second edges to be closer to the seat or backrest portion than portions of the belt that engage the first and second edges and thus applies tension to the belt to secure the child seat to the vehicle seat in a tensioned configuration.

12. The child seat according to claim 11, wherein the tensioning mechanism is configured to rotate, in response to receiving a substantially vertical force, from the second position to the first position to apply tension to the belt to secure the child seat to the vehicle seat in a tensioned configuration.

13. The child seat according to claim 11, wherein the belt path is defined between the tensioning mechanism and the seat base at a position proximate the center of the seat portion, so as to position the child seat in a rear-facing orientation.

14. The child seat according to claim 11, wherein the belt path is defined between the tensioning mechanism and the seat base at a position proximate the intersection of the backrest portion and seat portion, so as to position the child seat in a front-facing orientation.

15. The child seat according to claim 11, wherein the seat base further defines opposing side portions, wherein each side portion comprises a lock receiving portion, wherein the tensioning mechanism further comprises:

a locking mechanism comprising two laterally-opposing locking members configured to translate between an extended position and a retracted position, wherein each lock receiving portion is configured to receive a respective locking member when the tensioning mechanism is in the first position and the locking members are in the extended position, thereby locking the tensioning mechanism in the first position, and wherein the locking members are configured to automatically translate to the extended position when the tensioning mechanism is rotated from the second position to the first position.

16. A method for manufacturing a child seat configured to be secured to a vehicle seat in both a rear-facing orientation and a front-facing orientation, the method comprising:
providing a seat base defining a seat portion, a backrest portion, and first and second lateral edges that protrude forwardly and upwardly from the seat and backrest portions, wherein the seat base is configured to receive a belt of the vehicle seat in an untensioned state to secure the child seat to the vehicle seat in an untensioned configuration; and
attaching a proximal end of a tensioning mechanism the backrest portion of to the seat base, wherein a distal end of the tensioning mechanism comprises a sitting surface for an occupant of the child seat and an engaging surface facing opposite to the sitting surface, wherein the tensioning mechanism is rotatable downwardly and forwardly to a first position substantially adjacent to the seat base and upwardly and rearwardly to a second position displaced therefrom, wherein placing the tensioning mechanism in the second position allows the seat base to receive the belt, and the movement of the tensioning mechanism from the second position to the first position presses the belt against the first and second edges and deflects a portion of the belt between first and second edges to be closer to the seat or backrest portion than portions of the belt that engage the first and second edges and thus applies tension to the belt to secure the child seat to the vehicle seat in a tensioned configuration, wherein the seat base of the child seat is configured to receive the belt in both a rear-facing and front-facing orientation.

17. The method for manufacturing a child seat according to claim 16, wherein the seat base is configured to receive the belt so as to define a first belt path spanning the first and second edges, wherein each of the first and second edges further comprises an inlet channel and a retaining channel, wherein each inlet channel is configured to guide a portion of the belt into the respective retaining channel.

* * * * *

UNITED STATES PATENT AND TRADEMARK OFFICE
CERTIFICATE OF CORRECTION

PATENT NO. : 9,499,074 B2  
APPLICATION NO. : 14/063807  
DATED : November 22, 2016  
INVENTOR(S) : Strong et al.

It is certified that error appears in the above-identified patent and that said Letters Patent is hereby corrected as shown below:

In the Claims

Column 23, Claim 16, Lines 18 - 19, "attaching a proximal end of a tensioning mechanism the backrest portion of to the seat base, wherein a distal end" should read -- pivotally attaching a proximal end of a tensioning mechanism to the backrest portion of the seat base, wherein a distal end --.

Signed and Sealed this  
Twenty-eighth Day of March, 2017

Michelle K. Lee  
*Director of the United States Patent and Trademark Office*